US011107025B2

(12) United States Patent
Sun et al.

(10) Patent No.: US 11,107,025 B2
(45) Date of Patent: Aug. 31, 2021

(54) SYSTEM AND METHOD FOR PRODUCING AND DISTRIBUTING INFORMATION RELEVANT TO WATER EVENTS

(71) Applicants: John Sun, Herndon, VA (US); Janghwoan Choi, Oakton, VA (US)

(72) Inventors: John Sun, Herndon, VA (US); Janghwoan Choi, Oakton, VA (US)

(73) Assignee: STREAM METHODS, Inc., Herndon, VA (US)

( * ) Notice: Subject to any disclaimer, the term of this patent is extended or adjusted under 35 U.S.C. 154(b) by 718 days.

(21) Appl. No.: 15/839,928

(22) Filed: Dec. 13, 2017

(65) Prior Publication Data

US 2018/0165616 A1 Jun. 14, 2018

Related U.S. Application Data

(60) Provisional application No. 62/433,343, filed on Dec. 13, 2016.

(51) Int. Cl.
*G06Q 10/06* (2012.01)
*G06Q 40/08* (2012.01)
*G06Q 30/02* (2012.01)
*G06F 30/00* (2020.01)
(Continued)

(52) U.S. Cl.
CPC ......... *G06Q 10/0635* (2013.01); *G06F 30/00* (2020.01); *G06F 30/20* (2020.01); *G06Q 10/06* (2013.01); *G06Q 30/0201* (2013.01); *G06Q 40/08* (2013.01); *H04L 63/08* (2013.01); *Y02A 10/40* (2018.01)

(58) Field of Classification Search
CPC ................. G06F 30/20; G06F 30/00

USPC ............................................................ 703/9
See application file for complete search history.

(56) References Cited

U.S. PATENT DOCUMENTS 8,655,595 B1 * 2/2014 Green .................. G06Q 90/00
702/5

OTHER PUBLICATIONS

Hiller_ 2011 (Working with ARCVIEW 10 University of Pennsylvania School of Design, Original Publication Date: Jan. 7, 2011 Secondary Publication Date: Nov. 13, 2016 (Year: 2011).*

(Continued)

*Primary Examiner* — Brian S Cook
(74) *Attorney, Agent, or Firm* — IP-R-US, LLC; Peter S. Wong

(57) ABSTRACT

The present invention generates multiple models of water events based on various modeling processes input data. It can generate analytics of water events and integrating water models for displays. The present invention further produces derivatives, tools, and informational services for flood risk assessment; flood determination; and insurance rating. The present invention integrates and maintains all relevant inputs in one system for modeling water events at a given location in a timely fashion. The input datasets include water events' extent, flooded areas, floodplain, inundated areas and measurement of water condition. The datasets may include other data, such as, terrain elevation data, land use land cover data, soil conductivity, water gauge measurements and hydrologic regression equations for calculating flows. Other inputs may also include hydrologic modeling algorithms, hydraulic modeling algorithms, geospatial algorithms, and local or remote data of real-time water conditions acquired through machine services.

6 Claims, 12 Drawing Sheets

(51) Int. Cl.
*G06F 30/20* (2020.01)
*H04L 29/06* (2006.01)

(56) References Cited

OTHER PUBLICATIONS

EPA_2014 (Best Practice for Continuous Monitoring of Temperature and Flow in Wadeable Streams, Sep. 2014). (Year: 2014).*
NFHL_2008 (National Flood Hazard Layer (NFHL) New Products and Services for FEMA's Flood Hazard Map Data, 2008 FEMA). (Year: 2008).*

* cited by examiner

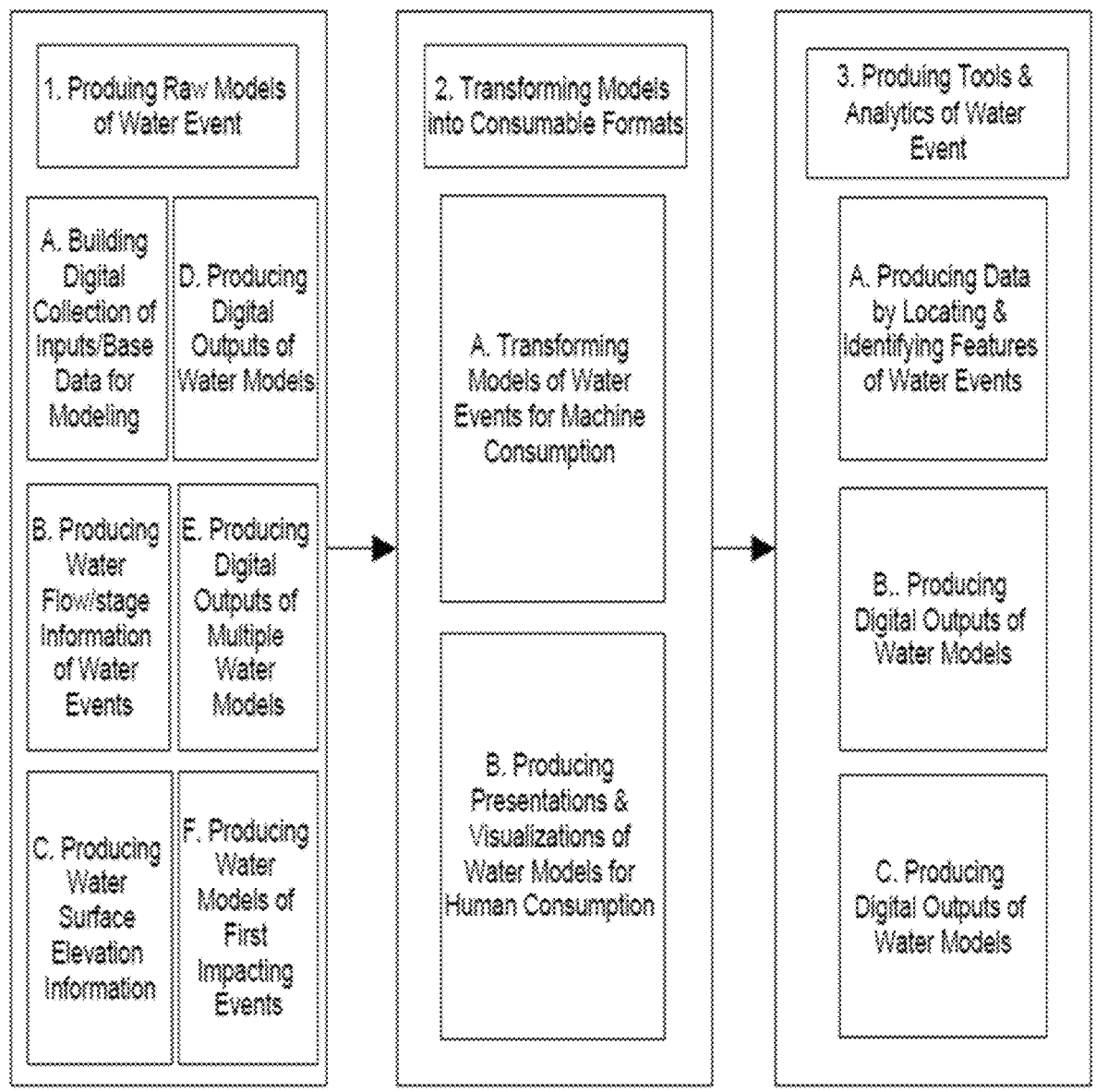
Fig. 1  Method and System of Water Events Production

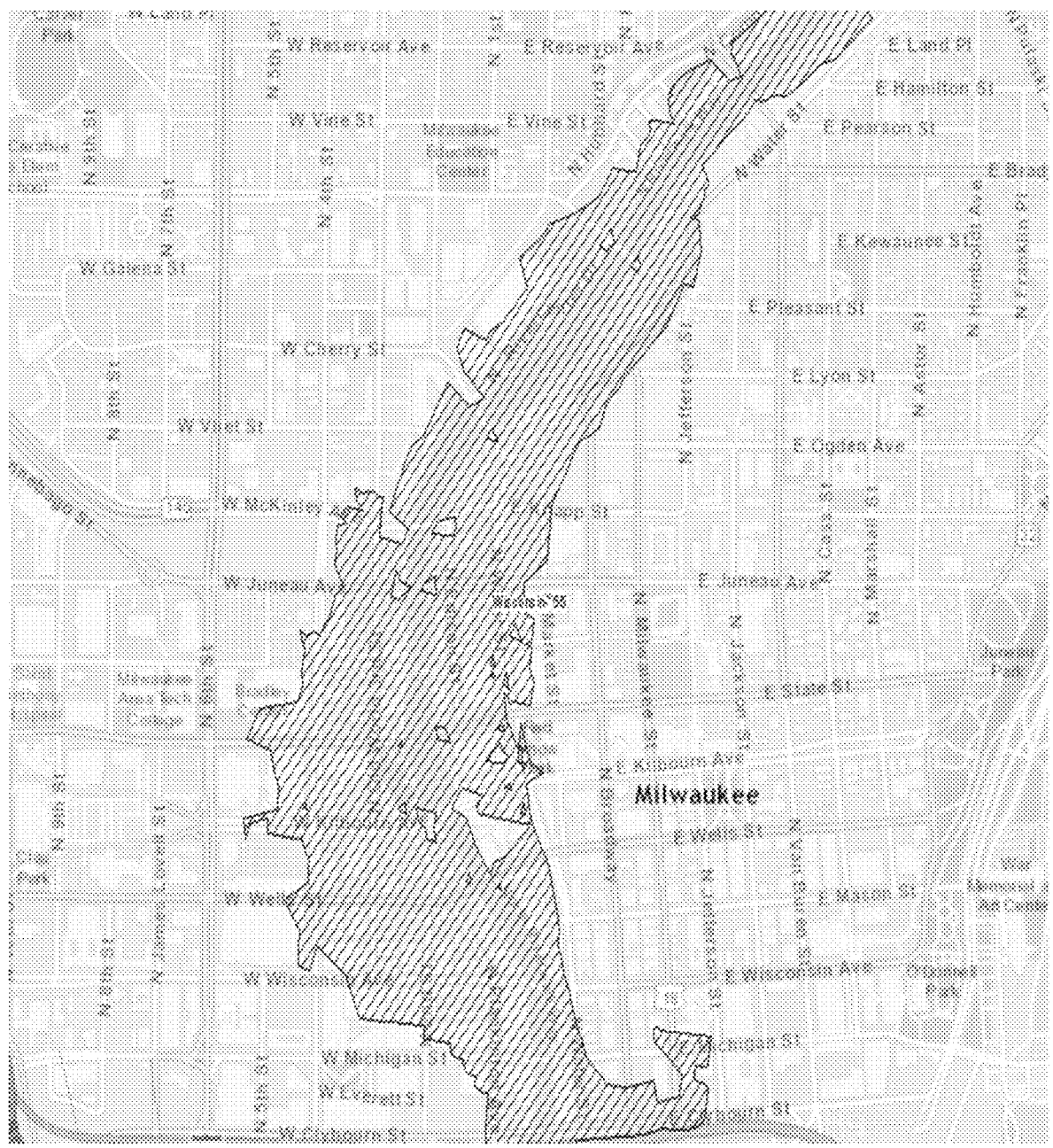
Fig. 2 Water Model Map of a historic event near downtown Milwaukee, WI on 6/21/1997

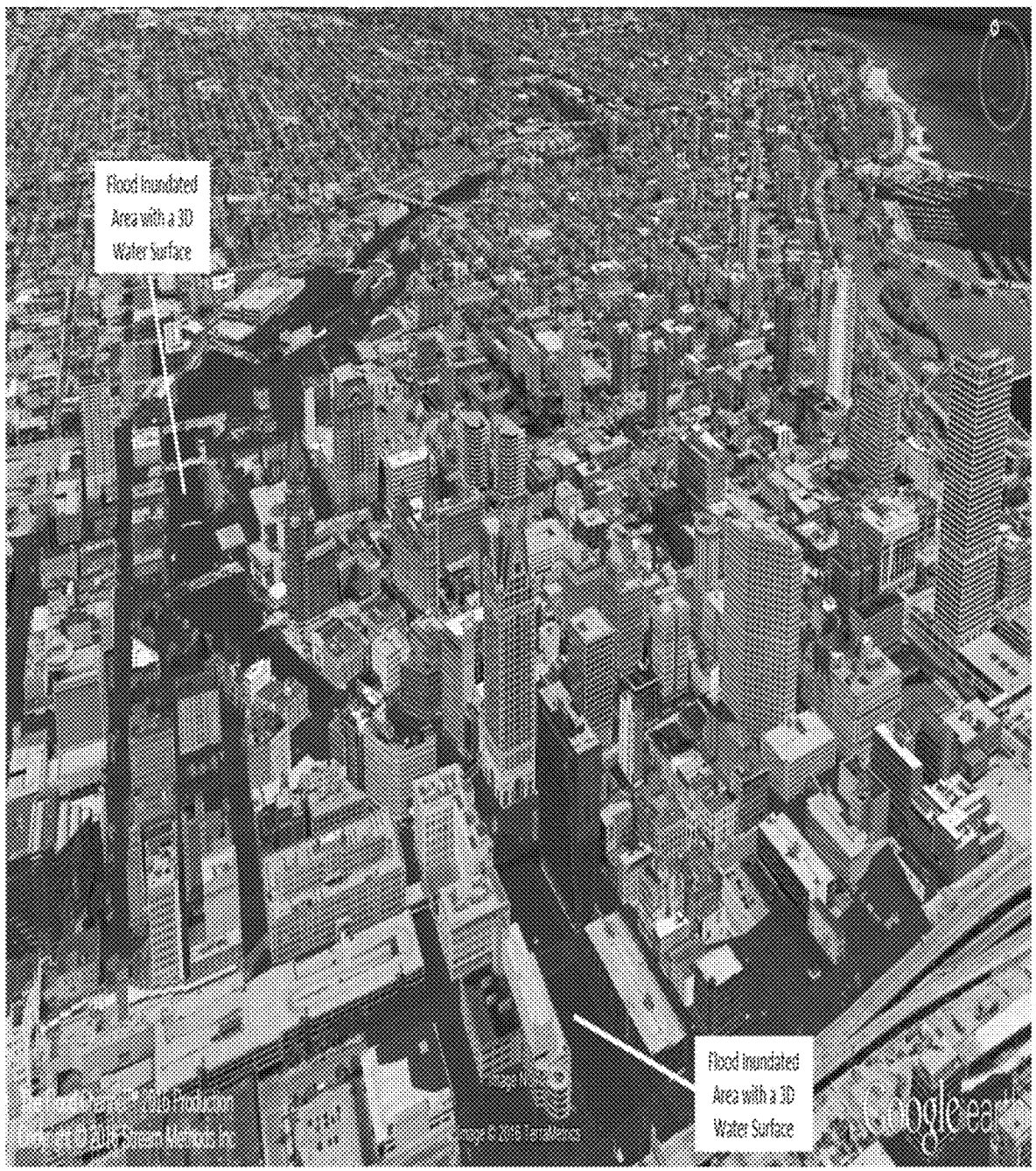
Fig. 3  Visualization for the Water Model of Fig. 2

Fig. 4 Visualization with "Elevated Flood Water Surface" produced using Google Earth Pro showing the "Half-Inundated" buildings

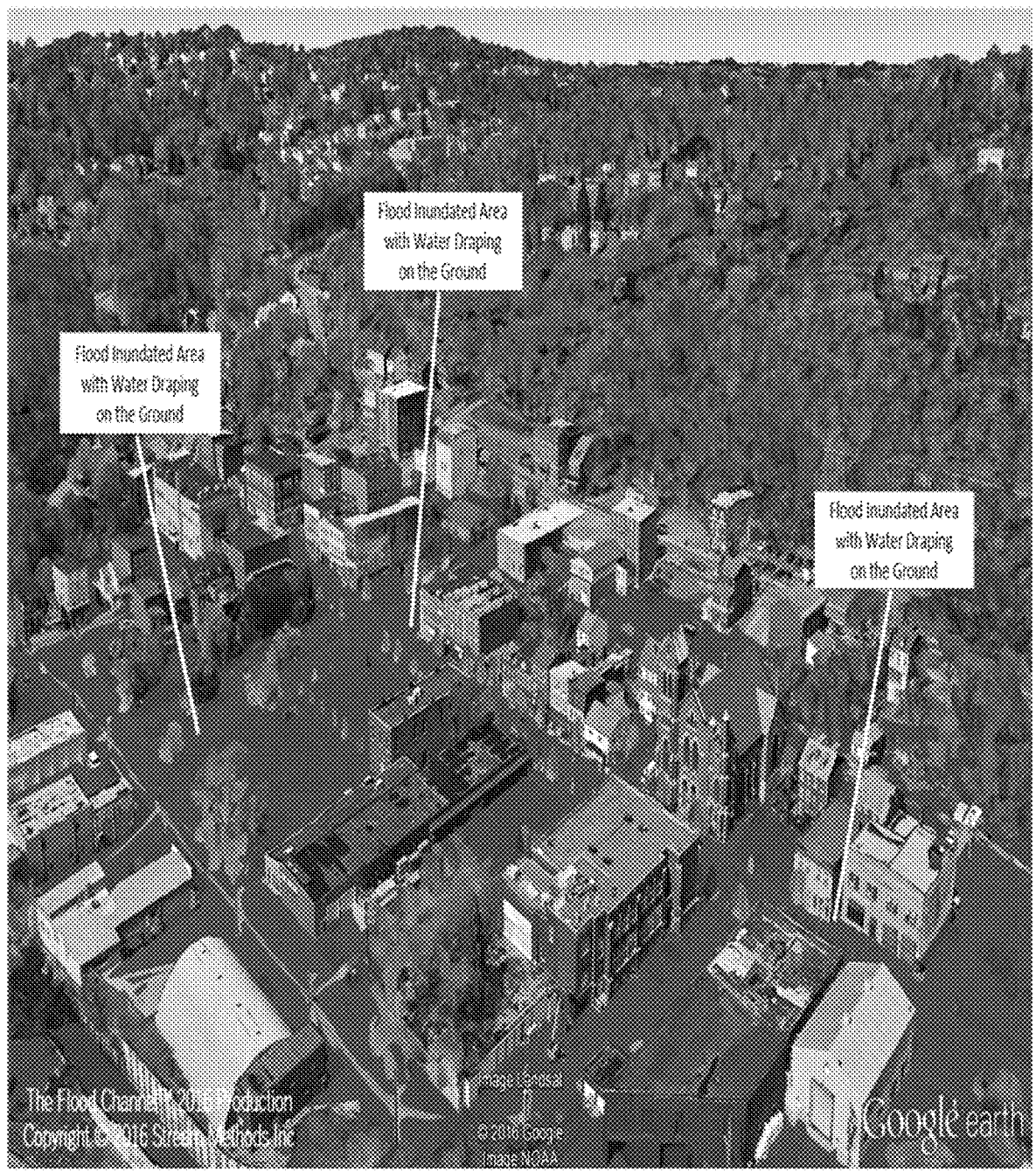
Fig. 5 Visualization without "Elevated Flood Water Surface" produced showing water at the foot of buildings

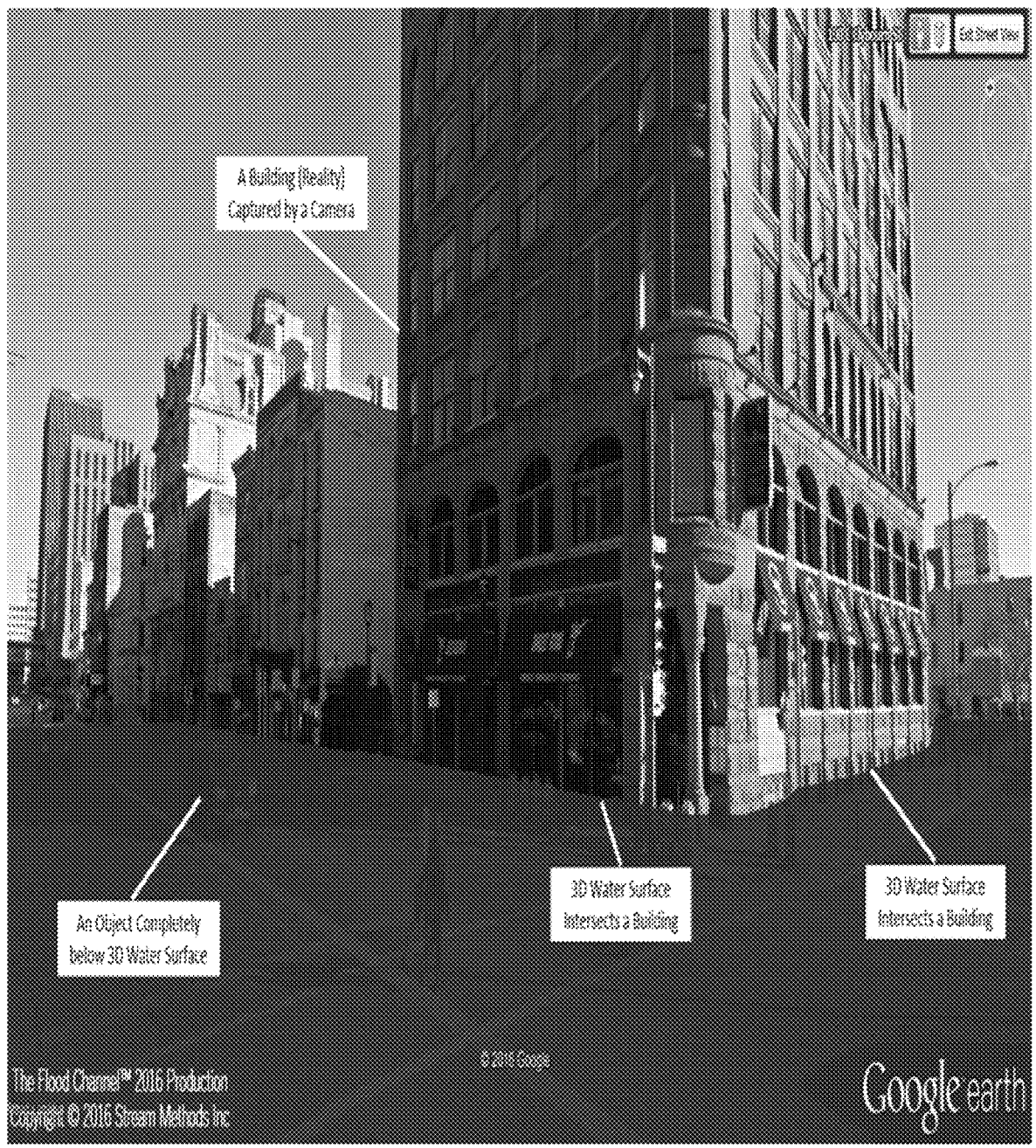
Fig. 6 Flood Augmented Reality using Google Street View reflecting the modeled flood depth for that location

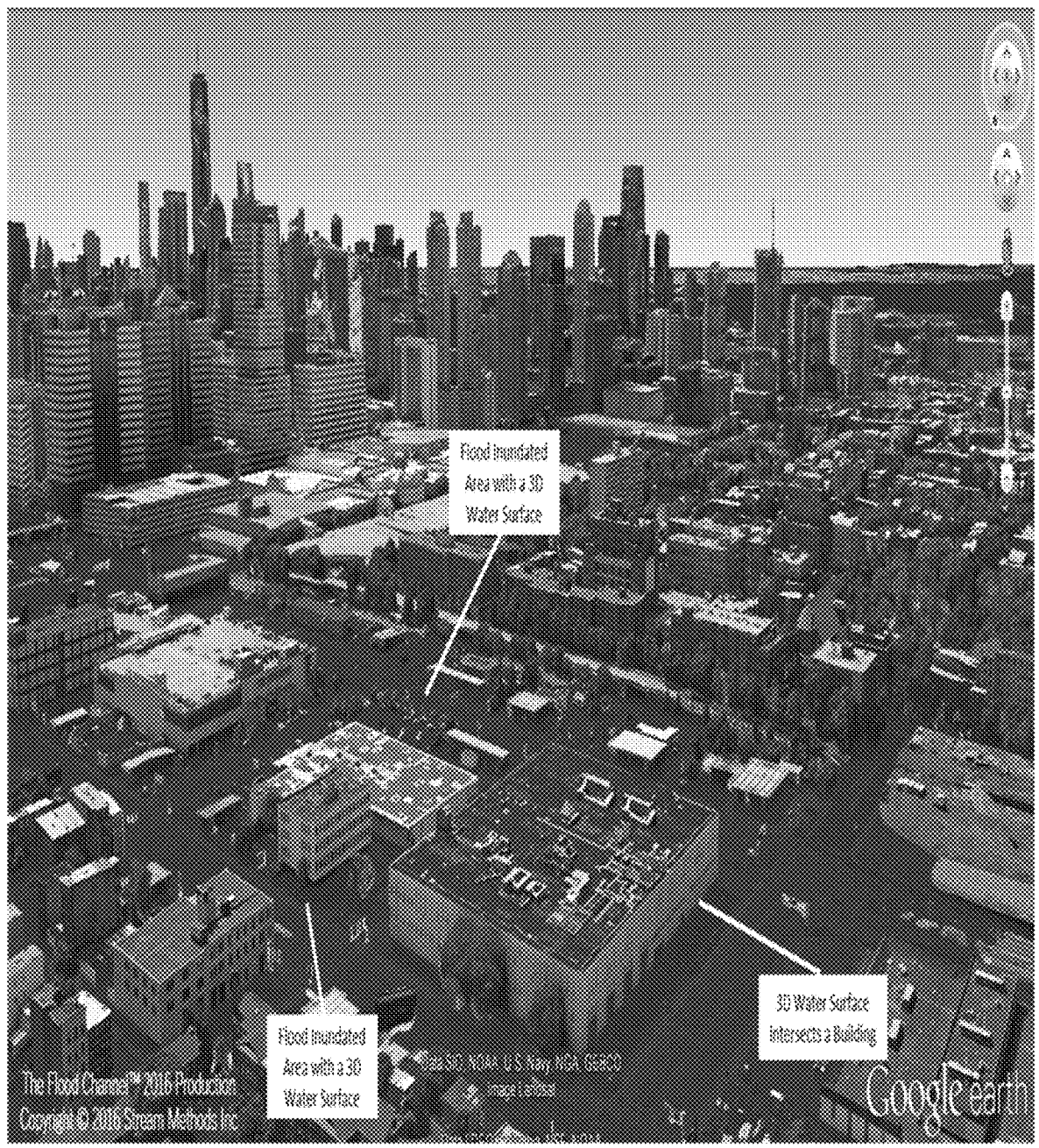
Fig. 7 One frame of a Fly-Over video showing the flooding event during Hurricane Sandy near Jersey City, NJ on 10/29/2012

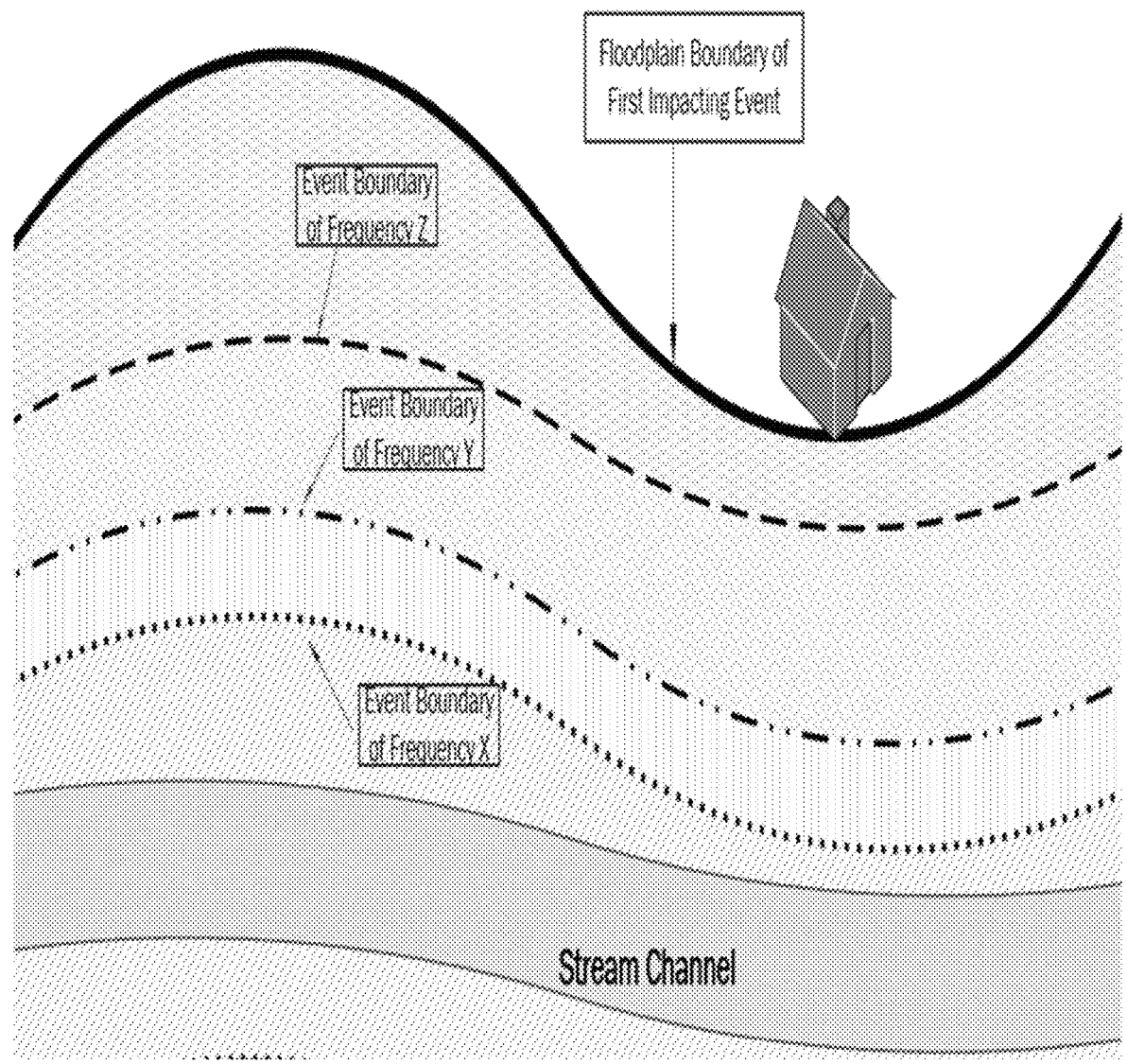
Fig. 8 Horizontal criterion of a Threshold (First Impacting) Event "touching" a location and a structure

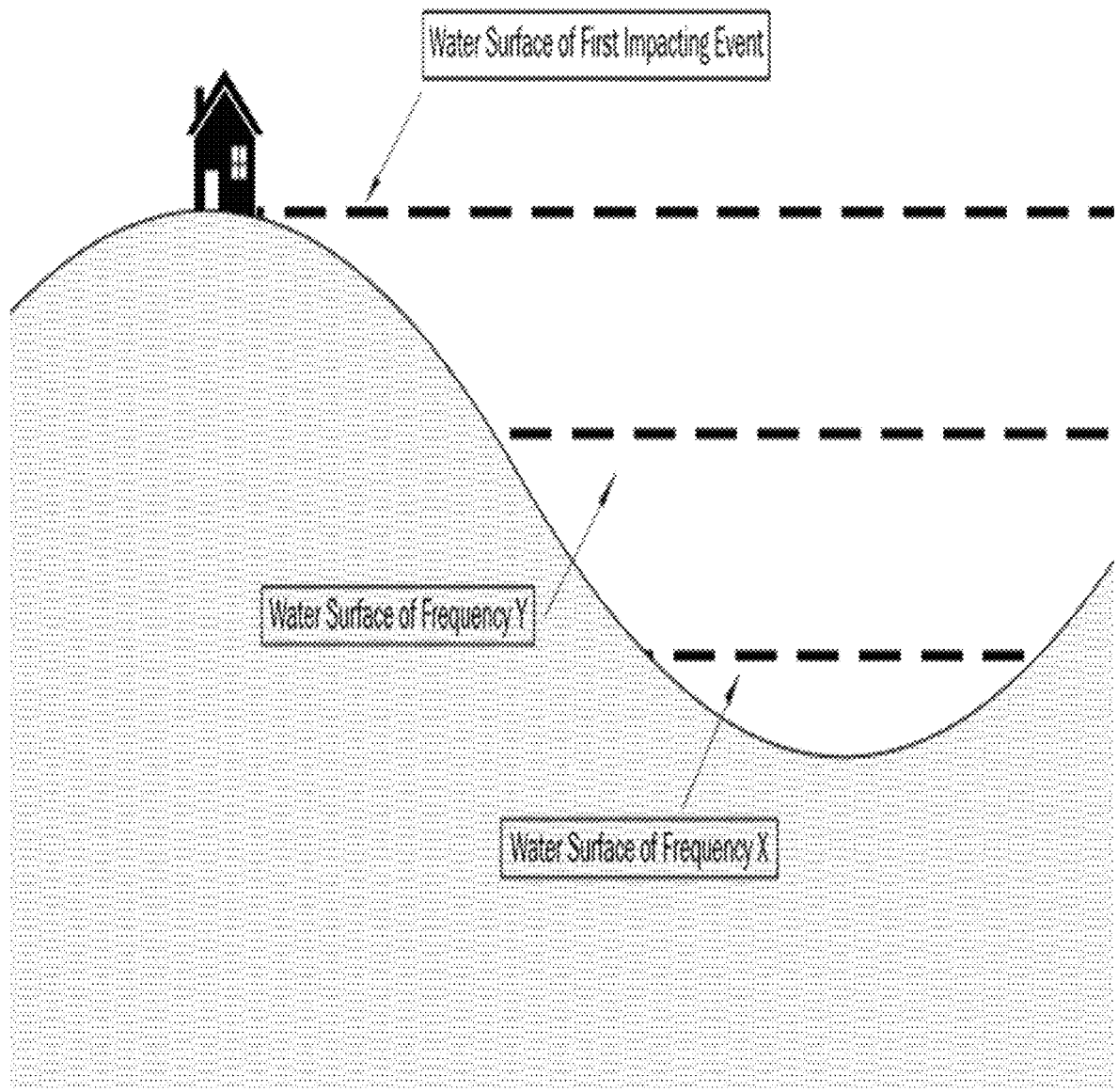
Fig. 9 Vertical criterion of a Threshold (First Impacting) Event "touching" a location and a structure

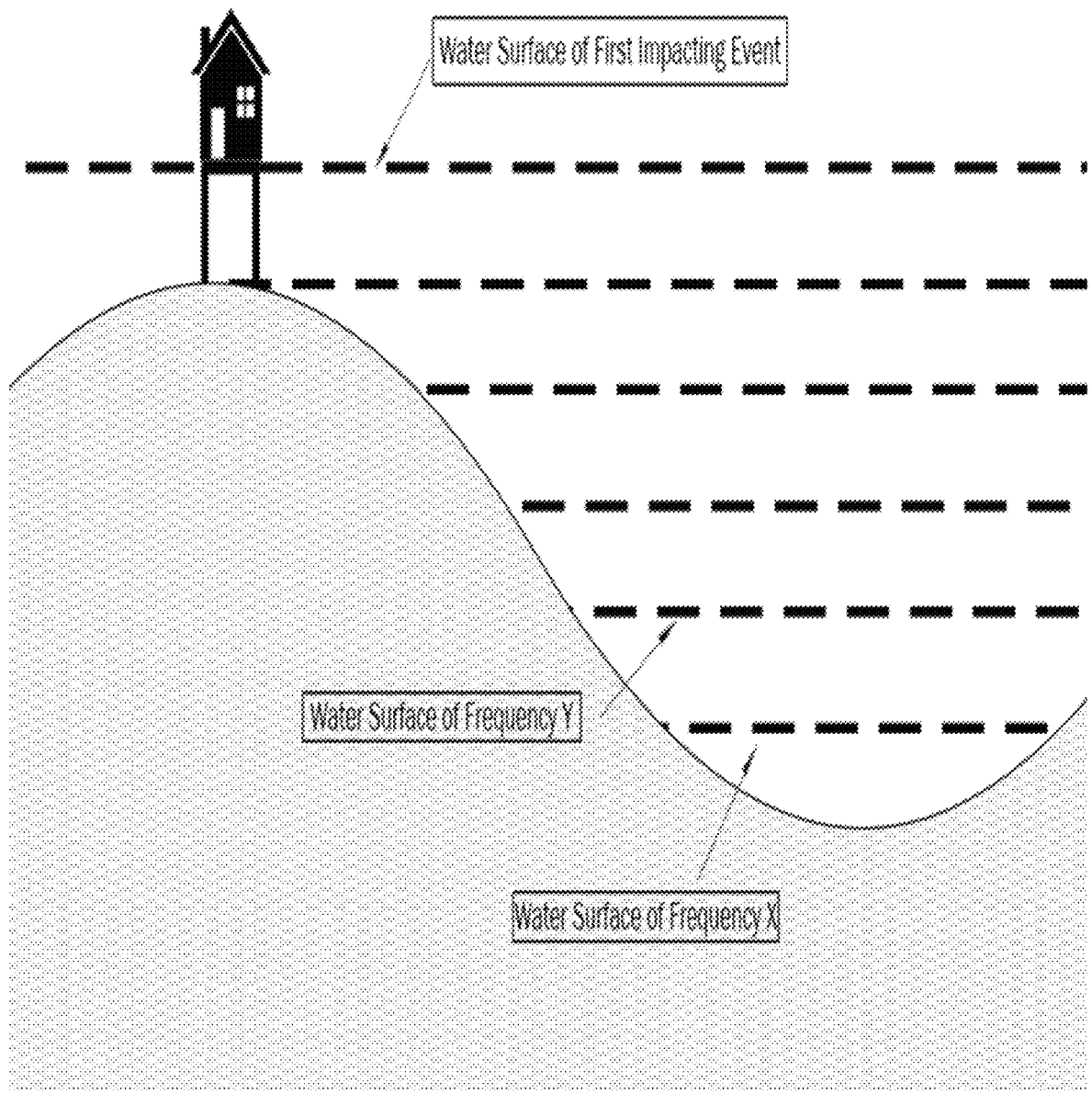
Fig. 10 Vertical criterion of a Threshold (First Impacting) Event "touching" a location and an Elevated Structure

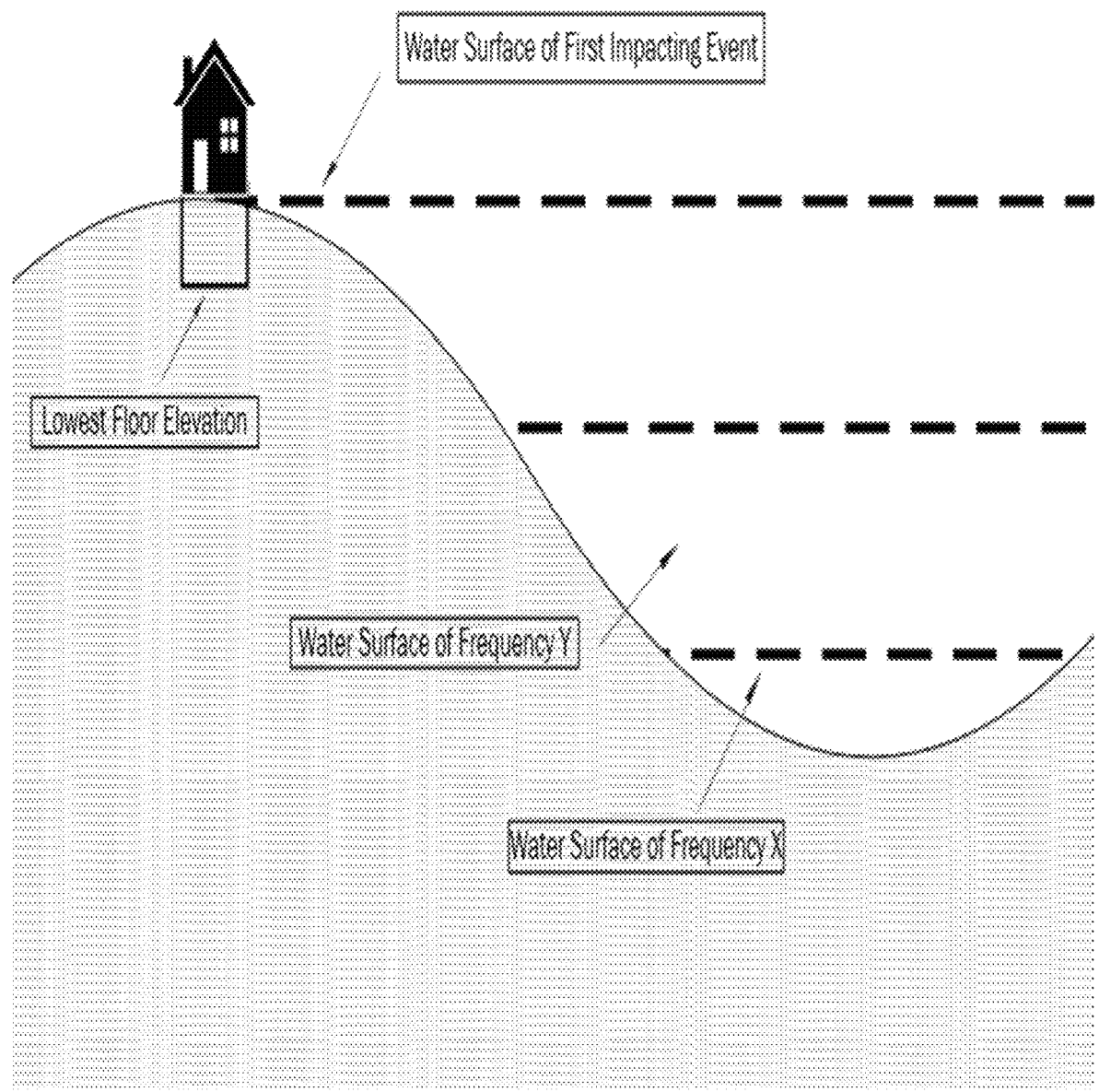
Fig. 11 Vertical criterion of a Threshold (First Impacting) Event "touching" a location and a structure with a basement

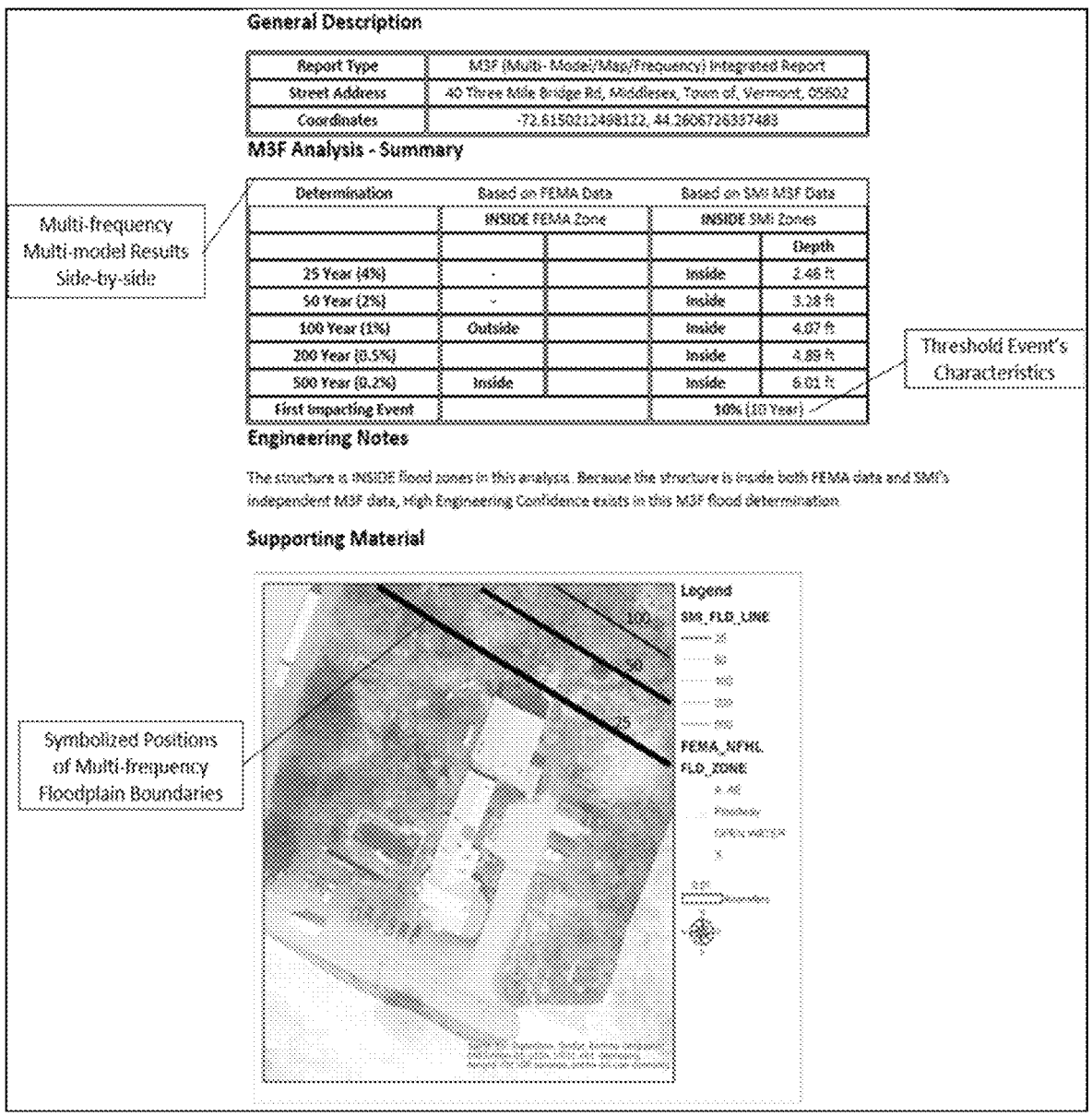
Fig. 12  Key parts of a M3F report with a Threshold (First Impacting) Event Determination

SYSTEM AND METHOD FOR PRODUCING AND DISTRIBUTING INFORMATION RELEVANT TO WATER EVENTS

This application claims priority to U.S. Provisional Patent Application No. 62/433,343 filed on Dec. 13, 2016, the entire content of which is incorporated herein by reference.

BACKGROUND OF THE INVENTION

The present invention relates to water events modeling including flood, the number one natural disaster in the world. Specifically, the present invention generates models of water events consist of one or multiple outputs from various modeling processes. It also generates analytics of water events, and integrating the water models for machine and human-eyes consumption. Further, the present invention produces derivatives, tools, and informational services for various purposes, such as, flood risk assessment; flood determination; and insurance rating.

Studying water events is a complex process involving experts in multiple scientific and engineering disciplines, including hydrology, hydraulics, mapping, computer simulation, computer visualization, and sophisticated geospatial algorithms. This process is time consuming and labor intensive for generating credible water models, such as, Federal Emergency Management Agency Flood Insurance Rate Map (FEMAFIRM.) Accuracy and quality of these water models are constant concerns. As a result, this process is very time consuming and costly. Until this point, it could take days, weeks, or even months to generate a credible flood model of a single frequency (e.g. 1%) for a location. Even though valuable for various purposes, such as, insurance rating, it is not practical to generate products of multiple models and frequencies. The present invention solves the above-mentioned difficulties of the water events modeling process.

SUMMARY OF THE INVENTION

One objective of the present invention is to produce timely and cost-effective products of water events.

Another objective of the present invention is to produce models and information products of various water events including historical; current; future; forecasted; real-time or near real-time; hypothetical; and scenario-based water events.

Another objective of the present invention is to model water events based on satellite imagery, aerial photos, pictures, or any other information.

Another objective of the present invention is to produce flood forecasting models, visualizations, and other information product.

Another objective of the present invention is to produce timely information products based on retrieved information from various sources, including NOAA's National Water Model, USGS water monitoring systems.

Another objective of the present invention is to produce various information products and analytics of various forms. Some examples are: forecast; notification; visualization; fly-over video; base flood elevation; probability; insurance premium rating; virtual perimeter; and integrated analytical report with multiple model outputs on a single map.

Another objective of the present invention is to create and distribute various graphics and videos of 3D water models; virtual reality; augmented reality or mixed reality; and elevated water surface. The present invention acquires products information from existing sources, or creates these products based on existing flood data from government agencies.

Another objective of the present invention is to produce and distribute information based on water threshold events, such as, precise risk rating and insurance premium rating.

Another objective of the present invention is to acquire indoor or outdoor elevations through acquisition, user input, analytical process, or barometric measurement.

Another objective of the present invention is to produce and distribute elevation related information, such as lowest adjacent grade, highest adjacent grade, by using geometric features including points, lines, and polygons defined by on-screen digitization.

Another objective of the present invention is to define and submit geographic features and objects by user digitization on screen.

Another objective of the present invention is to produce one or multiple water models and derivative products based on various methodologies.

Another objective of the present invention is to produce individual or integrated analytics based on one or multiple water models generated, for both human and machines to consume.

Another objective of the present invention is to distribute information products and analytics timely, on-demand, and machine-to-machine services.

Another further objective of the present invention is to produce and distribute derivatives for various purposes, including flood determination; risk communication; and insurance rating.

BRIEF DESCRIPTION OF THE INVENTION

A Water Event in this application refers to an occurrence at a given location in space and at an instant of time in which water level and its spatial reach have a more significant than normal impact. When water level is high, and its spatial extent is large, it would be a Flood Event. When water level is low, it could be a drought. A Water Event in the present invention can be current; historical; predicted or forecasted; future; real-time; near real-time; hypothetical; probabilistic; arbitrary; imaginative, or scenario-based.

The present invention is the process and systems of producing one or multiple models of water events and derivatives, based on various inputs. For modeling water events at a given location and in a timely fashion, the present invention prepares, aggregates, integrates, and maintains all relevant inputs in one system, the starting point of the process. The input data include various information, such as, information about events' extent, flooded areas, flood plain, inundated areas, and measurement of water condition. The input datasets also include various other data such as terrain elevation data, land use land cover data, soil conductivity, water gauge measurements, and hydrologic regression equations for calculating flows. The inputs also include hydrologic modeling algorithms, hydraulic modeling algorithms, and geospatial algorithms. The inputs also include data acquired through machine services, local or remote, such as (near) real-time water conditions.

The present invention outputs directly a set of digital water models, comprising a set of digital information, which later is used to build various artifacts and services. The present invention uses such models for capturing and storing the essence of the Water Events of interest. (Sometimes this patent application refers to such direct outputs as "maps" or "raw products.") Based on water models, the present invention then produces various analytics and derivatives, such as, 2D maps; integrated reports; web services; visualizations; analytics; software; and other tools of the event.

The present invention is to produce individual or integrated analytics based on one or multiple water models generated, for both human and machines to consume. For example, Observation-Based Model (current, historical, etc.); Reconstructing Models of historical events; forecasting or predicting models; Probabilistic Models; Hypothetical Models; and Scenario-Based Models, etc. The present invention further models past, current, future, forecasted, predicted, real-time, near real-time, historical; hypothetical, imaginative; and scenario-based water events. Models of "Threshold Events" are among the produced, and of great significance for various purposes including flood risk assessment; precisely rating flood insurance premium; and flood risk communication.

The present invention is to acquire, produce, and distribute virtual perimeters; and identify, locate, select, place, or manipulate features and objects inside an event's perimeter. Machines automatically act upon the ritual perimeter and associated information, such as sending and retrieving information, manipulating objects, producing new routes, etc.

The present invention is to allow machines or users to acquire information products and analytics through machines and machine services. These machines take automatic actions utilizing information products and analytics, such as, displaying information, pushing and pulling information, manipulating moving objects, placing virtual and physical objects, etc.

The present invention is to produce, acquire, distribute, and display flood, flood risk, and other information, such as base flood elevation, flood risk, flood information, elevations, premiums, probabilities, and virtual perimeters, on real estate information systems, insurance systems, reinsurance systems. The present invention identifies targets, timing, and dynamically push or pull information such as advertisement based on events that are changing overtime and space.

The present invention also defines a water-information system, a platform for connecting one or multiple groups of water-interested parties, distributing information, requesting and retrieving information from one or more remote sources, making recommendations, and facilitating transactions.

BRIEF DESCRIPTION OF THE DRAWINGS

FIG. 1 illustrates the system and the process of water events production.

FIG. 2 illustrates a 2D Map showing a water model of a historical event on Jun. 21, 1997 near downtown Milwaukee in Wisconsin.

FIG. 3 illustrates a 3D Visualization for the water model of FIG. 2.

FIG. 4 illustrates a 3D Visualization with "elevated flood water surface" produced using Google Earth Pro.

FIG. 5 illustrates a 3D Visualization without "elevated floodwater surface" produced.

FIG. 6 illustrates a flood augmented picture using Google Street View reflecting the modeled flood depth for that location.

FIG. 7 illustrates one frame of a fly-over video showing the flooding event during Hurricane Sandy on Oct. 29, 2012 near Jersey City, N.J.

FIG. 8 illustrates the horizontal criterion of a Threshold (First Impacting) Event "touching" a location and a structure.

FIG. 9 illustrates the vertical criterion of a Threshold (First Impacting) Event "touching" a location and a structure.

FIG. 10 illustrates the vertical criterion of a Threshold (First Impacting) Event "touching" a location and an elevated structure.

FIG. 11 illustrates the vertical criterion of a Threshold (First Impacting) Event "touching" a location and a structure with a basement.

FIG. 12 illustrates key parts of a M3F report with a Threshold (First Impacting) Event Determination.

DETAILED DESCRIPTION OF THE INVENTION

Referring to FIG. 1, Module 1 is described below as the system and method for producing one or multiple water models of a location. Module 2 is the system and method for producing analytics based on water models generated in the previous step. Module 3 is the system and method for producing further derivative products of water events for various purposes.

Module 1: Producing "Raw" Models of Water Events
1A: Building Digital Collection of Inputs and Base Data for Modeling Water Events Input and base data refers to information and data collected for modeling and describing water events. The present invention collects, processes, and maintains various base data/inputs for modeling water events. Besides as data files residing on a computer, input and base data can also take the form of machine services (including web services,) which are hosted remotely and accessed over the network. Real-time and near real-time data are important generating timely current and forecasted events.

The present invention comprises key inputs including the following:

Existing Water Models and Data

Obtaining water data previously produced is an important process for conducting further studies. For example, for studying flood, most commonly used data sources include Federal Emergency Management Agency (FEMA) Flood Insurance Rate Map (FIRM), either digital or on paper. Usually, this type of flood data contains only one frequency, 1%, and contains no flood water surface information. (Sometimes it provides multiple frequencies and water surface elevation information.) This data can serve various purposes including as input for generating other analytics.

Digital Terrain Data

This type of data includes Digital Elevation Model (DEM) data and Digital Terrain Model (DTM). These data describe the high and low variations of earth surface. The present invention acquires this data from various sources including United States Geological Survey. The preset invention uses digital terrain data in various resolutions, common ones include 90 meters, 30 meters, 12 meters, 10 meters, 5 meters, 3 meters, and 1 meter. Institutions around the world produce terrain data. For the United States, USGS produces National Elevation Dataset (NED.) National Elevation Dataset consists of high precision ground surface elevation data for the United States. National Elevation Dataset is available in a geospatial data structure and file format for storing raster-based Digital Elevation Model (DEM). The present invention also produces its own terrain data based on data inputs such as contour maps, LiDAR, remote sensing data, or existing terrain data. Digital terrain data is the key to hydrologic and hydraulic modeling, coastal modeling, inundation modeling and mapping, visualization, and risk modeling.

Surface Water Dataset

The present invention collects, processes, and maintains digital datasets of surface water (rivers, lakes, ocean, etc.) as another key input for modeling water event. For example, the preset invention uses attributes about flow lines of streams to determine where the channel is, and which direction water flows naturally. Various acquisition sources exist for such datasets. For U.S., the National Hydrography Dataset Plus (NHDPlus) is a hydrologic framework dataset built by the U.S. Environmental Protection Agency (EPA) Office of Water, assisted by US Geological Survey (USGS.) In this dataset, a COMID is assigned to each segment of stream. The present invention uses this COMID to interact with other data and systems, such as National Water Model (NWM), to query and retrieve simulated stream flows. The National Water Model is a hydrologic model, developed by the National Weather Service that simulates observed and forecast stream flow in the United States.

Land Use and Land Cover Data

The present invention uses such data, as key inputs to hydraulic modeling process, for estimating land roughness coefficients such as Manning's n values to determine water surface elevation at model node. Various sources exist for acquiring such data. In the U.S., the National Land Cover Database (NLCD) is a dataset created through a cooperative project conducted by the Multi-Resolution Land Characteristics (MRLC) consortium. The National Land Cover Data trice serves as a definitive, Landsat-based, 30-meter resolution, land cover database for the U.S. to provide spatial reference and descriptive data for characteristics of the land surface.

Water Measurements

Actual readings, analytics, or derivatives based on measurements performed by various devices are important for water science. They serve various purposes including, providing real-time or historical measurement of water at a given location; aiding the development of forecast models; and building mathematical and statistical models based on historical measurements of water at a given location.

Based on water measurements, the present invention also builds its own regression equations for estimating flow volume of water for un-gaged locations, and providing basis for calibration of various models.

Various ways exist for measuring water conditions including measurement by using a "stick" in the field. Some institutions operate a collection of water gauges, based on which water information is produced and distributed. For example:

a) National Weather Service (NWS) of National Oceanic and Atmospheric Administration (NOAA) operates and maintains telemetry at selected stream gaging locations in support of its mission to forecast flood and water supply. Similarly, US Geological Survey and other institutions around the world operate and maintain large number of water gauges. Measurement and derivative data based on these gauges serve various purposes including the establishment of an official flood stage, quantitative river forecasts, flood warnings, and determination of crest height and times to reach crest. The NWS Advance d Hydrologic Prediction Services (AHPS) provides enhanced information and products through the infusion of new science and technology. Access to hydrologic information and forecasts are provided through web sites and web services. The present invention system accesses such web services to retrieve hydrologic information provided in XML format for serving various purposes such as conducting or calibrating hydrologic modeling processes.

b) National Digital Forecast Database (NDFD) Extensible Markup Language (XML) is a service providing the public, government agencies, and commercial enterprises with data from the NWS digital forecast database.

c) The US GEOLOGICAL SURVEY (USGS) National Water-Use Information System (NWIS) provides the nation's water-use information aggregated at the county, state, and national levels through Web Interface and Web Services. The present invention system accesses such web services to retrieve water data via automated methods and parse the results to be used in hydrologic analyses and processes. Peak flow data retrieved from the NWIS are used in frequency analysis to develop flood flow event such as 100-year event flow to create Federal Emergency Management Agency (FEMA) flood hazard areas. Instant stream flow is used in hydraulic models to generate water elevation surface models, based on which to produce inundation models.

d) The Global Runoff Database at GRDC (Global Runoff Data Centre) is a collection of river discharge data collected at daily or monthly intervals from more than 9,200 stations in 160 countries. This adds up to around 390,000 station-years with an average record length of 42 years. The German Federal Institute of Hydrology (Bundesanstalt für Gewässerkunde or BfG) currently hosts the GRDC in Koblenz.

e) US GEOLOGICAL SURVEY (USGS) National Stream flow Statistics (NSS) Program is a computer program that provides a simple method for applying regional flood-peak stream flow estimates and low flow frequency/duration stream flow estimates. The NSS program works with a database containing USGS regression equations and parameters of the equations. The present invention system accesses the NSS program and its data to retrieve regression equations used to estimate the magnitude and frequency of floods in the United States.

f) United States Department of Agriculture (USDA) Natural Resources and Conservation Service (NRCS) provides the Soil Survey Geographic Database (SSURGO). This dataset is a digital soil survey and generally is the most detailed level of soil geographic data which consists of geo-referenced digital map data and computerized attribute data. Soil properties are commonly used as independent variables in the USGS regression equations. The present invention processes soil geographic data, along with other independent variables, to be used with the USGS regression equations for estimating the magnitude and frequency of floods. Soil properties are also used in hydrologic modeling to estimate rainfall loss by infiltration into the ground to replenish Earth's groundwater. Rainfall that neither evaporates, transpires, nor penetrates the surface flows over the land into places, where water collects, reaches to the rivers, and becomes stream flow. Soil data is an important input to hydrologic models in estimating stream flow from rainfall.

g) Other examples of input data for modeling water events include: precipitation data; climate Data; data based on radar such as WSR-88D for use with hydrologic models; NASA's Global Precipitation Mission (GPM) data; and NASA's Global Flood Monitoring System (GFMS) data (including real time Tropical Rainfall Measuring Mission and Multi-Satellite Precipitation Analysis precipitation information as input to a quasi-global hydrological runoff and routing model.)

h) Other input information such as satellite imagery, aerial photos, pictures of flood water, documents, etc.

The present invention also uses various data and utilizes any interested data with location information to serve various purposes, such as, locating and identifying features within an inundation area. Some examples of such data are: roads; bridges; infrastructures; mobile objects; demographic data; building footprints; building characteristics; time zones systems; and State Plane Coordinate System (SPCS) coverage, etc.

The present invention utilizes various input data to model water events accurately, rapidly, and cost-effectively. For example, the present invention uses various tiling mechanisms for utilizing terrain data to make the modeling proceed on a "seemingly" seamless terrain dataset for a large geographic area. The present invention also periodically maintains and refreshes input data to avoid obsoleteness.

1B: Producing Water Flow/Stage Information of Water Events

Based on various inputs, algorithms, computer code, Geospatial Information System (GIS) capabilities, and mathematical hydrologic and hydraulic models, the present invention estimates stream flows and water surface elevations at various locations including rivers, streams, tidal locations, and coastal areas. Similarly, the present invention estimates water stage for coastal areas. The present invention obtains or calculates water flow by various methods including acquiring or deriving from gauge measurements; estimating based on hydrologic model simulation; estimating hypothetically or arbitrarily; estimating based on statistical analysis; obtaining from historical high water marks or empirical relationship between stage and discharge; obtaining from satellite imagery analysis; or randomly generating from sampling methods such as Monte-Carlo simulations. Among various methods for distributing a "known" stream flow at one location to locations of unknown stream flow, the present invention prefers flow transport methods.

Methods Based on Gauge Measurements

The present invention accesses, acquires, and processes information associated with gauge measurements to estimate water flow. Such information includes gauge datum, significant stages and flows, rating table, observed and forecasted water stage and flow data, etc. The preset invention obtains and consumes information including rating tables or curves (relationship between stage and discharge at a given location of a stream); discharges (volume rate of water flow that is transported through a given cross sectional area in a river or stream); hydrographs (graphs showing the rate of flow versus time past a specific point which can be displayed through user interface.) When such information is accessible through web services, such as those operated by National Weather Service's (NWS), the present invention obtains and processes such information by various mechanisms such as by gauge ID (called GaugeLID).

Similarly, the present invention obtains and processes other services, such as USGS National Water-Use Information System (NWIS) web services, by gage ID to estimate or obtain stream flows and rating tables. Flows and corresponding stages derived from rating tables are used to create water surface elevation models. The present invention uses peak flow events, obtained by statistical frequency analysis of peak stream flows, to develop water surface models for water events, for example, a 100-year flood event. (Modeling water surface elevation is later described in Module 1C.)

Methods Based on Hydrologic Models

The present invention uses various hydrologic models and algorithms to estimate water flows. The current preferences are the three listed below:

I. Hydrologic Modeling System produced by U.S. Army Corps of Hydrologic Engineering Center (HEC-HMS). To estimate stream flows in a river or stream, HEC-HMS simulates the complete hydrologic process of dendritic watershed systems. The present invention generates model inputs for the HEC-HMS and runs the model to produce stream flows. Then the estimated stream flows are fed into a hydraulic model later to determine water surface profile at a cross section or node.

II. National Weather Service's National Water Model (NWM) web services by COMID (common ID) to retrieve information, in XML format, which contains simulated and predicted discharges. The present invention uses the discharges as input to hydraulic models later to create a water surface elevation model and other products such as inundation maps.

III. Hydrologic Regression Equations, developed either by USGS, other institutions around the world, or its own.

Methods Based on Imagery Analysis

Observation of flooding event are frequently available as satellite imagery or aerial photos. Not only the spatial extent of flooding can be delineated based on such data, but also other information such as water flow volume, depth information, etc. can be estimated when combining with extra data such as terrain characteristics.

Methods Based on Other Recorded Information

Description of water reach, high water mark, pictures of water on a landmark, etc.

Hypothetical, Arbitrary, or Imaginative Flows

The present invention uses hypothetical, arbitrary, imaginative, or essentially any water flow as input to create water (surface) models. For example, the present invention uses various design flows, one type of hypothetical flow, for designing hydraulic structures such as dams, retention ponds, and bridges.

Randomly Generated Flows

As an alternative way to determine Federal Emergency Management Agency (FEMA) flood zones using sampling methods, the present invention randomly generates stream flows, for use as input for creating a series of water surface models to show the probabilistic distribution of spatial extent of inundation. Monte Carlo simulation is among the techniques used by the present invention.

Peak Discharge

The present invention utilizes a subsystem based on USGS National StreamStats database, National Water-Use Information System (NWIS) web services, and nationwide geo-spatial datasets, to compute peak discharges using the USGS regression equations. The peak discharges are used as input to the modeling process to estimate water surface profiles.

Low Flows

The present invention models and simulates water events using low stream flow statistics obtained by using various methods such as the USGS regression equations developed for the ungauged sites. The present invention uses the low stream flow statistics for a variety of applications including water quality and quantity management at both gauged and ungagged sites.

1C: Producing Water Surface Elevation Information of Water Events

Water surface elevation is one of the most important aspects of modeled water events. The present invention uses various combinations of hardware and software for this process. For example, ESRI's ArcGIS software running on Microsoft Operating Systems, a popular choice among practitioners, is the current preferred combination.

The present invention takes various input data such as topographic data, hydrographic data, land use data, stage and flow model information, to construct channels, cross sections, bank lines, flow paths, and structures. The digital data results are converted into various formats suitable for use as inputs to various hydraulic models, for example, the industry standard (Hydrologic Engineering Center River Analysis System (HEC-RAS) model. The present invention integrates various hydraulic models to generate outputs that contain water surface elevations.

The present invention uses various models for generating water surface elevation of water events including the following:

A. Gridded Data-Based Inundation Model (GIM)

This is a method of spatial interpolation of discrete water surface elevations at model node (1D model.) The present invention uses cross sections to create Triangular Irregular Network Model (TIN) to represent water elevation surface. The present invention converts water elevation surface TIM to gridded data and stores it in a grid file format. A Digital Elevation Model (DEM) is a digital model or 3D representation of a terrain's surface. The present invention generates water depth grid by subtracting DEM from the water elevation grid. The water depth grid greater than or equal to zero is selected to create a binary grid (cell value of zero or one): 0 (zero) represents water depth value at a grid cell is lower than a corresponding DEM cell value, 1 (one) represents water depth value at a grid cell is greater than or equal to the corresponding DEM cell value. The binary grid cells of 1 (one) is converted into a polygon file which defines the spatial extent of inundated area.

B. Triangular Irregular Network Model (TIN) Based inundation Model

This is a method of spatial interpolation of discrete water surface elevations at model node (1D model.) The present invention uses cross sections as the source of water elevation to create Triangular Irregular Network Model (TIN) to represent water elevation surface. Water depth TIN is generated by intersecting the water surface TIN by terrain elevation TIN. The present invention performs TIN intersection in various software platforms including open-source software such as QGIS and GRASS, or commercial software such as ESRI ArcGIS. The present invention's module of 'Surface Difference' function performs TIN intersection and outputs polygon feature classes containing three values: above, same, and below. (A feature class is a collection of geographic features with the same geometry type, the same attributes, and the same spatial reference.) The present invention performs plane intersection between two TINs (water surface TIN and terrain elevation TIN) by following the steps below:

i. Run the Surface Difference tool, which outputs a polygon feature class ii. Open the attribute table of the polygon feature class and select the record in the talk that has a code of 1 iii. With this selection, right-click the feature class and navigate to Data>Export Data. Specify output location for the selection. This outputs a polygon feature class.

iv. Run Feature to Line tool to converts the polygon to a line feature class. This line defines the boundary between the TIM surfaces.

C. 1D Hydraulic Models

To generate channels, cross sections, bank lines, flow paths, and structures in digital format, the present invention takes various input topographic data, hydrographic data, land use data, stage and flow model (information.) The present invention converts all the digital data to input formats for various hydraulic models such as HEC-RAS model. The present invention integrates various hydraulic models for generating outputs that contain water surface elevations assigned to cross sections. Among various 1D hydraulic models that can serve the modeling purpose, the current preference is HEC-RAS.

D. 2D Hydraulic Models

The present invention takes topographic data, hydrographic data, land use data, stage and flow model (information) to generate 2D computational meshes for which computational cells can be triangles, squares, rectangles, or multi-sided elements. The present invention converts the computational meshes to proper input files for various hydraulic models such as HEC-RAS. The present invention executes hydraulic models to produce outputs of the models, extract the outputs, such as water surface elevation profiles, to be assigned to the centroid of each computational cell. The present invention determines the spatial extent of inundated area using various methods including GIM and TIM mentioned above. FIG. 2 illustrates a 2D Map showing a water model of a historical event on Jun. 21, 1997 near downtown Milwaukee in Wisconsin.

E. 2D Hydraulic Model Coupled with 1D Hydraulic Model

The present invention takes cross sections and other model data for 1D hydraulic models and computational meshes for 2D hydraulics models to generate input files for various hydraulics models that supports 2D hydraulic models coupled with 1D hydraulic model. The preset invention executes 2D hydraulic models coupled with 1D hydraulic models to produce outputs of the models. The present invention reads the outputs of the models, extracts water surface elevation profiles, and assigns the extracted water surface elevation profiles to the cross sections and computational cells. The water surface elevations at the cross section and at the centroids of computational cells are spatially distributed to create water surface elevation model, such as water surface TIN. The present invention determines the spatial extent of inundated area using various methods such as GIM (Gridded Inundation Model) or Triangular Irregular Network Model (TIN) mentioned above. Among various 2D hydraulic models that can serve the modeling purpose, the current preference is HEC-RAS 5.0 or later.

F. 3D Hydraulic Models

The present invention takes topographic data, hydrographic data, land use data, stage and flow model (information) to generate computational elements to be used to create various 3D hydraulic models. The present invention executes 3D hydraulic models to produce outputs of the models and reads, extracts, and converts water surface profiles to be assigned to the computational elements. The water surface elevations at the centroids of computational elements are spatially distributed to create water surface elevation model, such as water surface TIN. The preset invention determines the spatial extent of inundated area using various methods such as Gridded Inundation Model (GIM) or Triangular Irregular Network Model (TIN) mentioned above.

The present invention also hypothetically, probabilistically, or arbitrarily assigns elevation of water surface for a water event. The present invention uses various methods for building water elevation surface for coastal or tidal locations. For example, the present invention take s water stage from a gauge, such as those operated by the NWS or USGS, to produce a water surface elevation model. FIG. 3 illustrates a 3D Visualization for the water model of FIG. 2.

G. Stream Method, Inc. Tidal (SMIT) Model

SMIT model takes any water stages (such as measured stages, hypothetical, forecasted, arbitrary, imaginative) to generate inundation models. For example, SMIT model takes water stage reading, such as one provided through the NWS web services, to produce a water surface elevation model. Model domain is predefined as a polygon for which water surface elevation is assumed to be constant. The present invention converts the water stage obtained from various sources to water surface elevation by adding a datum. The water elevation is then assigned to the vertices of the polygon. The elevated polygon is used to create a water surface TIN. The present invention determines the spatial extent of inundated area using various methods such as Gridded Inundation Model (GIM) or Triangular Irregular Network Model (TIN) mentioned above.

H. Use of Coastal Hazard Analysis Modeling Program (CHAMP)

The present invention uses Coastal Hazard Analysis Modeling Program (CHAMP) to develop water surface elevation profiles for each transect. The present invention reads the water surface elevation profile from CHAMP database and assigns it to the vertices of each transect. All the elevated transects are used to create water surface elevation model, such as water surface TIN. The present invention determines the spatial extent of inundated area using various methods such as Gridded Inundation Model (GIM) or Triangular Irregular Network Model (TIN) mentioned above.

The present invention also hypothetically, probabilistically, or arbitrarily assigns elevation of water surface for a water event for tidal or coastal locations. Direct measurement by a water monitor is another way to determine and develop water surface elevation. Gauges operated by various institutions such as NOAA and USGS provide valuable data. With a known water surface elevation at a gauged location, the present invention then develops a water surface that covers a larger area in vicinity of the gauge. For example, an engineer can choose to simply assign a constant water surface elevation for an open area surrounding the gauge.

1D: Producing Digital Outputs of Water Models

The above modeling process results in digital models of water events, including delineated event boundaries and water surface elevation. For example, outputs of a riverine model of 1% flood event include hydraulic model outputs such as HEC-RAS files, water elevation surface TIN files, water depth raster files, inundation polygon files, etc. A direct output of the above modeling process can take various forms and formats. The present invention transforms these "raw forms and formats" for various consumption purposes, e.g. for human, for machines, or both. The present invention uses various combinations of hardware and software for this process. The current preference is ESRI's ArcGIS software running on Microsoft Operating Systems. FIG. 4 illustrates a 3D Visualization with "elevated flood water surface" produced using Google Earth Pro. For Comparison, FIG. 5 illustrates a 3D Visualization without "elevated floodwater surface" produced 1E: Producing Digital Outputs of Multiple Water Models of a Location For a location, the present invention produces multiple water models by repeating the above process (1A-1D.) The present invention produces various models of various frequencies, historical inundations, current conditions, or any other scenarios. For example, the preset invention produces and utilizes multiple frequencies of peak flows for a location (e.g. 2% 1% and 0.2%) to determine "Threshold Events" such as First Impacting Events. The present invention also obtains various water models from various sources; Federal Emergency Management Agency (FEMA) Flood Insurance Map (FIRM) data with one or more frequencies is among the most commonly obtained. The multiple models, produced or obtained by the present invention, can be compared, overlaid, and analyzed to generate new analytics and insights. For example, by comparing models of same events from different sources, the present invention generates a confidence level about the data. If the data of different sources indicate the same level of flood risk, then the confidence in the data is relatively high. But when the data from different sources indicates significantly different risk level, the confidence level in data would be lower.

Since the present invention can produce all these models rapidly and cost-effectively, this information become practically valuable for various decision making.

1F: Producing Water Models of Threshold Events

To accurately determine and describe flood risk of a location or a structure affixed to the location, the present invention produces water models of "threshold" water events, such as significant events when water first "touches" a location or a structure. This threshold event can also be referred by various names such as "Minimum Impacting Event," or "Base Impacting Event." Now, the preferred name for this concept of threshold events is "First Impacting Event."

Threshold water events also includes those when water level exceeds "First Impacting" level and reach certain criteria, such as, maximum damage on a building is reached; maximum coverage of an insurance policy is reached; and building or floor roof is reached, etc. This type of threshold events serves as "upper boundary" of the event. This threshold event can be referred by various names such as "Maximum Impacting Event." Now, the preferred name for this concept of threshold events is "Last Impacting Event."

A water event that qualifies as First Impacting event must meet the following criteria:
  Horizontally, the spatial extent of this flood event must touch the location of interest or the structure of interest.
  Vertically, for a location, the water level of the event must equal to the lowest "bare earth" elevation of the location of interest. For a structure at a location, the water level of the event must equal to or greater than the lowest (floor) elevation of the structure.

Threshold Events, and associated characteristics, can be determined or estimated by various methods, algorithms, and techniques, precisely or approximately for various purposes. For example, for determining a First Impacting Event, the current preferred method is to progressively model the mid-point event of two bounding events until a satisfactory result is reached. For example, if a location resides between 1% and 2% chance floodplains, a rough estimate of First Impacting Event of 1.5% is the mid-point and and modeled. If the location sits between 1% and the new bounding mid-point of 1.5% chance floodplains, then 1.25% is modeled. The iterative process goes on until it reaches a satisfactory level of approximation. In general, the more frequencies are modeled, the better the estimate of First Impacting event is. For example, if a location is between 1% and 2% chance floodplains, a rough estimate of 1.5% as the first impacting event is acceptable. But if flood models are produced incrementally with 0.1% step and the location is between 1.3% and 1.4% floodplains, then 1.35% is a better estimate for First Impacting event, better than the estimate of 1.5%.

The present invention introduces and produces various models and values to characterize a threshold event and its associated conditions. "First Impacting Characteristics," for example, is a set of numerical values that the present invention generates to describe a First Impacting event. Various First Impacting Characteristics include:

First Impacting Frequency

For a location, the present invention produces a single flood frequency representing the "threshold" probability of flood risk when floodwater first "touches" a location or a structure. For example, First Impacting Frequency can be 10% (a.k.a. 10-year event) for a building close to the river channel, but can be 2% for a house farther away from a channel. By comparing the two frequencies, one understands with clarity the higher risk of the first house. Further, an insurance underwriter can use such a frequency in an actuarial process for better estimation of insurance premium.

To determine a First Impacting Frequency, the present invention conducts frequency analysis on peak flows, and based on which then progressively produces water models. By overlaying a location or a structure footprint, the one frequency that "touches" first is determined. In general, the more frequencies are modeled, the better estimation of First Impacting Frequency is.

In this process, the present invention considers of the (bare earth) elevation of the location. This is the "base" First Impacting Frequency that can be consistently determined and compared for any location. It considers the water surface elevation and the bare-earth elevation of terrain. But it does not factor in structure elevation. For example, water of a 1% flood event reaches the bare-earth elevation of a location, but if the structure at the location is elevated, the 1% event flood water would not affect the structure, meaning the First Impacting Frequency is lower than 1% (Describing in another way, the 1% frequency is impacting the location, but not necessarily impacting the structure at the location yet.) To determine First Impacting Characteristics for a structure at a location, structure characteristics such as elevation of the structure and Lowest Floor Elevation, if available, are factored in to produce a more accurate determination of a First Impacting Frequency.

It is important to differentiate the First Impacting Event/ characteristics associated with a location (bare-earth) and the one with a structure at a location.

First Impacting Flow

First Impacting Flow is the water flow associated with a First Impacting Event. This water flow is obtained through frequency analysis of peak flow data and is used in the modeling process to determine the water extent for a frequency, water surface elevation, water depth, etc.

First Impacting Stage

First Impacting Stage is a threshold water stage (water height) measured at a location (reference location that is usually different from a location of interest) when water starts to "touch" a location or a structure of interest. This concept can have various and practical usages. For example, for a location or a structure such as an intersection or a building. First Impacting Stage can be 24 feet, meaning if the water stage reaches 24 feet at "the reference point", the water would start to affect the location or the structure. People can simply pay attention to what stage it is at the reference point, and instantly know whether that stage would mean danger. A community can set up its own "reference point" a location and in advance model flooding events of various staves to determine the First Impacting stage of all the locations of interests. By monitoring and communicating the actual measurement during an event in a timely fashion, citizens would easily understand the meaning of the message and get proper warnings. For communities, this is a "cheap" way to set up a flood monitoring system. It can be as simple as a painted ruler at the river bank or bridge, and a webcam points to it and lively broadcasts stage. Communities does not need to have sophisticated and expensive equipment to measure water stage to get a flood warning in advance. A person does not even have to look at a map to understand or predict the danger. A radio message would suffice.

First Impacting Water Surface Elevation

First Impacting Water Surface Elevation is the "threshold" water surface elevation associated with a First Impacting Event for a location or for a structure. For a location, the First Impacting Water Surface Elevation can be determined or identified when the bare-earth elevation of the location is equal to the modeled water surface elevation. This "base" can be used consistently for any location and is a powerful indicator of flood risk for that location. Based on this consistent indicator, further adjustment can be made by bringing in other information such as structure characteristics.

The First Impacting Water Surface Elevation for a structure can be determined by bringing in structure characteristics at that location, such as Lowest Structure Elevation (a.k.a. Lowest Floor Elevation or First Floor Elevation). The First Impacting Water Surface Elevation is the one that is equal to the Lowest Structure Elevation.

The Threshold Events, such as First Impacting events, can be determined through modeling, or arbitrarily set. For example, an apartment owner on the $15^{th}$ floor of an apartment building can simply define his or her "first impacting flood event" as when water touches that floor, which is different from the building owner's determination, which might be when the water level reaches the first floor.

Similarly, the present invention produces various information products describing other threshold events'. For a last impacting event, for example, various characteristics and conditions, including frequency, return period, stage, damage estimate, wave condition, wind condition, and water level, can be determined through modeling (similar to determining First Impacting event) or can be arbitrarily set. (For an insurance underwriter, for example, he or she can simply set the last Impacting Event as one when water surface elevation exceeds the floor elevation by 4 feet, and the house or the insurance policy is totaled.)

The Threshold Events and associated characteristics are valuable for various purposes such as determining historical inundation of a location or a structure. For example, once a first impacting stage is determined at a nearby water gauge, the present invention queries the historical records of that gauge to extract records that are above the threshold the First Impacting Stage. The present invention then determines how many times the location or structure were inundated, which is a valuable piece of information various purposes including setting insurance premium and risk communication. Other characteristics of First Impacting Events can serve similar purposes.

Threshold events can serve as unique "risk scores" for a flooding source for any location or structures affixed to that location.

Threshold events can serve as lower and upper boundary conditions, allowing precisely rating risks of water event, as a result precisely rating insurance premium. For example, the preset invention determines that the First Impacting Event on a building is 0.5% event, with a certain water surface elevation, and the Lasting Impacting Event is 0.25% event, where the water surface elevation is 4 feet higher. Using these boundary conditions, the precise risk of the house can be rated, as well as the precise premium of insurance. (The most dominant way of insurance rating today is based on single frequency of event, which is either under or over pricing. The preset invention solves both mathematically and practically.)

When characteristics and conditions of Threshold Events are aggregated, results provide insight about water event for a group. For example, aggregated First Impacting analytics can provide insight about flood risk for a community or about a portfolio of insurance policies.

The concept of "Threshold Event" is innovative and groundbreaking. It is designed to describe water and water-associated risk in an insightful yet simple, consistent, and accurate way. It can be applied to any location consistently and therefore can be compared easily. It is simple and easy to understand and to use, yet they are powerful for various purposes including flood risk determination, risk rating, actuarial calculation, risk comparison, and risk communication. Like location, it is a unique and insightful descriptor for that location. It is a key characteristic of a location or a structure such as road, building, bridge, etc. It has significant implications on how risk is communicated. This concept is out-of-the-box thinking, comparing to using only fixed flood events, even a single frequency, for flood risk assessment, which is the established and conventional way.

To determine through modeling a Threshold Event and associated characteristics, many scenarios need to be modeled before determining which one is a threshold event on a location or a structure. While the models are valuable for various purposes, if using the "established way" (or the conventional way) of producing them, the high cost alone would prohibit them from wide and practical applications and usage. Stream Methods Inc.'s invention has made using threshold event practical today. Insofar as we know, the present invention not only is the inventor of the above concepts, it also is the sole producer of such models and analytics in rapid and cost-effective way.

Module 2: Transforming Models of Water Events into Consumable Forms and Formats

The present invention transforms water models obtained from various sources, or those produced on its own, into consumable forms and formats for consumption by either human or machines.

Direct output of the hydrologic and hydraulic processes usually produces a model of water event in an "esoteric" form, which is not for easy consumption by everyone or for every purpose. The "raw" model is usually a set of digital information; to consume, one would need certain software, hardware, and means to transform those "esoteric forms" into something that can be consumed by human or machines with less friction or frustration. The transformed models can take on various forms and formats, physical, virtual, or both.

2A: Transforming Models of Water Events for Machines to Consume

Machines can be software, hardware, or any combination of the two. Examples of software include various insurance underwriting systems, navigational systems, controlling software for driverless vehicles, unmanned drones and other vessels, Geographic information systems (GIS) software, special software for broadcasters, web browsers, and emergency response systems. Examples of hardware include electronic boards, computers, mobile wearables, mobile phones, GPS receivers, electronic systems in a vehicle or a vessel, game consoles, equipment of virtual reality, equipment of augmented reality, or equipment mixed reality, etc. Machines can consume water models in various ways, such as real time, near real time, pre-event, or post-event.

Once machines are capable of consuming models of water event, they can then conduct various operations for various purposes, such as calculating flood insurance premium, conducting flood assessment, locating assets, placing objects, supporting decision making, advising, sending notification, sending alerts, sending flood warning, communicating flood risks, or promoting awareness of water event. The present invention transforms models of water events into various forms and formats such as: KML; KMZ; Shapefile; Geo database; MapInfo's ".tab"; Micro station's ".dgn"; Virtual Raster (*.vrt); Geo TIFF (*.tif); National Imagery Transmission Format (*.ntf); ERDAS Imagine Images (*.img).

The present invention transforms water models into suitable formats, such as KML, by using various hardware and software, such as Google Earth products. The current preference is relying on a utility software, without which the task often becomes too tedious. (But an operator can choose to create KMLs by simply using just a common text editor software.)

The present invention transforms models of water events into various data structures (data schemas) such as Federal Emergency Management Agency (FEMA) FIRM (Flood Insurance Rate Map) database. It performs such transformation using various combinations of software and hardware. The current preference is utilizing GIS (Geographic Information System) software packages. Examples of such packages include QGIS; ArcGIS by ESRI; Mapinfo; Micro Station; AutoCAD, etc.

The present invention comprises various transformation workflows including the following listed:

1) The present invention transforms a water model into a FEMA's DFIRM database, whose structure is defined by Federal Emergency Management Agency (FEMA). The output FIRM databases can be in various formats; preferred ones include Geodatabase, Shapefile, KML, and KMZ formats. Choosing various formats such as Geo database or Shapefile, the present invention loads and manipulates the databases into various software such as ArcGIS software.

2) The present invention allows an operator to "extract" flood plains, such as one contained in a Federal Emergency Management Agency (FEMA) Flood Insurance Map (FIRM) database, from a water model and export them into various formats such as Geo database; Shapefile, KML, or KMZ. The operator can choose whether to include water surface elevation information for the flood plain. If the elevation information is preserved in the resulted data, the flood plain, the inundated area, and the modeled water surface can be displayed and manipulated in a 3D fashion. The present invention transforms, individually or in a batch, Federal Emergency Management Agency (FEMA) Flood Insurance Maps (FIRMs) into KML/KMZ format with "elevated" water surface, based on which other derivatives such as animated visualization can be produced.

3) Similarly, based on water models, the present invention produces depth grids (a.k.a. depth-grids) for a given location. These are information in raster formats containing the water depth information relative to earth ground. The present invention further transforms the depth grids into other formats for the consumption by human eyes or machines. For example, if converted to KML/KMZ format, the depth grids can then be manipulated and displayed by software such as Google Earth or Google Map.

4) The present invention creates models of water events based on retrieved water flow information from National Water Model (NWM). The present invention then transforms the resulted models into various forms and formats for human and machine to consume. One preferred output is the inundation models and maps in various formats such as geo database, shapefile, gif, tiff jpeg, jpg, png, kml, kmz, etc.

5) Similarly, the present invention transforms various inundation maps and libraries, such as those created and hosted by government agencies and their associates (e.g. NWS, USGS, and FIMAN of State of North Carolina,) into various consumable forms and formats.

6) The present invention transforms models of water events, produced by its own or acquired from various sources, into computer services (a.k.a. web services, software services, etc.) so that one or more capabilities of the water models can be accessed through a prescribed interface. For example, the present invention "live" stream KMLs for consumption by software such as Google Earth (Pro edition or others.) On the side of consuming devices, a piece of software uses "network links" to access this server and request data in KML format. Various machines, such as those with Google Earth (Pro edition or others) installed, can directly access, interpret, and manipulate the data of the water model. This method of web service is particularly effective and efficient to make water models accessible timely and by large numbers of machines. Besides KML, various formats and protocols exist for web services including Open Geo spatial Consortium's WMS format, an open standard for streaming location information. One mechanism to construct such services is using an "application server," such as ArcGIS Server, to transform the water models into various streaming services.

7) The current preferred approach for distribution and transformation of machine-consumable water models is through dynamic web services. These services, hosted on a server, allow machines request information of water events from a host over a network such as the internet, receive and parse data provided by the host, and manipulate the resulted data as wish. For example, a machine of a weather broadcaster can retrieve timely forecasting model of inundation through a web service, and choose to display the retrieved information in his or her program. As another example, insurance underwriting software can retrieve one or more water models to assess flood risk and estimate premium; insurance underwriting tools can retrieve data of First Impacting Events for its underwriting purposes.

8) The present invention uses various combinations of hardware and software, such as ArcGIS Desktop, for transforming water models into various formats for other software and hardware to create various derivatives and analytics, such as maps of Federal Emergency Management Agency (FEMA) Flood Insurance Map (FIRM) style for on-screen or on paper display, graphics, posters, videos, etc.

9) The present invention transforms water models into proper formats, such as KML, KMZ, or Shapefile format, for software such as Google Earth (Pro edition or others) or Google Map to consume. The present invention has various components for this transformation, including those built upon ArcGIS Desktop. The present invention preserves the information contained in the water models fully or partially during this transformation depending on the operator's objective. For example, an operator can choose to eliminate the elevation information of the water surface; instead, preserving the boundary of the water event only. (Current preference is to preserve water surface elevation in the output; benefits include displaying the water surface in three-dimensional fashion to avoid water always clamps to the ground.)

10) During the transformation process, the present invention modifies, reduces, or adds data to serve various purposes. It applies various special processes and algorithms. Operators can also specify various configuration parameters of the transformation such as spatial resolution, amount of data to include, spatial extent, unit choice, etc.

2B: Producing Presentations and Visualizations of Water Models for Human to Consume Presentation and visualization of water event are representations of modeled water events to enable exploration, analysis, and communication. Often, they can aid a human to sense certain "hidden" aspects of a water event that are not easily sensed otherwise. While they can be powerful, good presentation and visualization are difficult to design and create. A good representation must be based on accurate and credible models of water events, yet producing good water models alone is usually a complex and expensive process, as those described in Module 1. A good representation of water event also needs to look attractive and interesting to viewers, which is challenging for obvious reasons. Good representations need to be easy to consume and digest, posing as little friction as possible on the consumer. If too much or too little information is included in the representation, or the "theme" is too subtle, consumers would have a difficult time to understand and interpret.

The present invention produces representations of models of water events in various forms and formats such as, textual or graphical, 2D or 3D, physical or virtual, stationary or animated, temporal or a single point in time, or any combination of the above. This process is based on real time, near real time, historical, forecasted, hypothetical, probabilistic, arbitrary, or imaginative scenarios. The present invention produces graphics, audios, videos, podcasts, radio shows, messages, paper maps, reports, etc. The present invention transforms "raw" water models into graphics, for example, for display on screens of various devices, or on various materials such as paper, poster board, glass, plastic, cloth, etc. The present invention transforms water models and display them on various media including TV, internet, newspaper, etc. For example, the preset invention produces pictures, static and graphical visualization, of water events, to be used on TV and internet to describe historical or forecasted flooding events. The present invention produces pictures and videos (animated graphics) portraying various water events such as current and looming flood events and broadcasts them on TV and internet, live or as recorded. The preset invention displays 3D visualizations of water events, such as historical or probabilistic scenarios, on a computer screen and allows viewers to interact with it, besides just "seeing." Good representation and visualization of a water event, such as historical or probabilistic scenarios, are powerful risk communication tools during a meeting regardless the meeting is face-to-face or web-based.

The present invention creates representations of water events by treating water events as the main theme of a representation, or using the water events to augment or enhance another theme. Key inputs to this "representing and/or augmenting" process include water models produced in Module 1, or those acquired and transformed in Module 2A, or data from various other sources. The present invention adds, reduces, eliminates, or modifies relevant information to further augment and enhance the representation and visualization.

Some examples of preferred methods of the present invention are listed below:

1. The present invention transforms various flood products, including Federal Emergency Management Agency (FEMA) Flood Insurance Rate Maps (FIRM) and databases created by government agencies and associates, into 2D or 3D visualizations, graphics, videos, maps, and other products. The present invention distributes and broadcasts the end products on TV, internet, or media. Similarly, the present invention transforms those inundation maps produced and hosted by government agencies (e.g. NWS, USGS, and State of North Carolina) and their associates. The current preferred way of this transformation is to preserve the water surface elevation contained in the original water models; an "elevated" water surface model would allow further utilization and manipulation of the model in 3D fashion. The present invention includes automated functionalities to aid this transformation process.

2. The present invention transforms, in batch or individual mode and by using various software and hardware, Federal Emergency Management Agency (FEMA) FIRM products into a form with "elevated" water surface in formats such as KML/KMZ format, for creating visualizations using software such as Google Earth (Pro edition or others.) The present invention can perform such transformation on the fly and serve the result through an Application Server over the network. Similarly, the present invention transforms and serves inundation maps and libraries, produced and hosted by government agencies (e.g. NWS, USGS, and State of North Carolina) and associates.

3. Based on such transformed products, and by using various software such as Go ogle Earth (Pro edition or others), the present invention produces various 2D or 3D visualization and other products. For example, using Google Earth Pro, an operator can predefine "flight paths" and "tours" that later are used for creating animations and videos. (Besides using a predefined tour, the present invention records videos by recording live movement of the mouse, keyboard, or other control devices.) Creators of visual products should work closely with (potential) viewers on creating path, tour, etc. to get the final products to satisfaction.

4. The current preferred preference for creating visualization of Federal Emergency Management Agency (FEMA) Flood Insurance Map (FIRM) products, inundation maps, multi-frequency products, or other data, is to create detailed and photo realistic 3D visualization. To accomplish this, the current preference is to use software such as Google Earth (Pro edition or others), which provides photo realistic buildings, trees, etc. in 3D.

5. Similarly, the present invention creates and transforms water models based on retrieved water flow information from National Water Model (NWM) or other sources into various forms and formats, such as maps, graphics, videos, 3D visualization, etc. Insofar as we know now, nobody else has created timely hydraulic models, maps, and other derivatives using NWM as input as the present invention does.

6. Similarly, the present invention transforms various inundation models and products, including those maps and libraries created and hosted by government agencies and their associates (e.g. NWS, USGS, and State of North Carolina FIMAN system) into various forms and formats for human (and machine) to consume.

7. After transforming water models into various formats such as KML, KMZ, Geodatabase, and Shapefile, the present invention loads them into various software packages such as ArcGIS Desktop and Google Earth (Pro edition or others) to create derivatives such as 2D or 3D visualizations. The present invention adds various data layers, either static or dynamic, to overlay with water models. For example, the present invention adds one or multiple water models as well as other types of data such as satellite imagery and landmarks. The present invention utilizes static data files, or dynamic web services, by which data is "streamed" to a machine with a display screen to create visualizations. The preset invention connects and utilizes Federal Emergency Management Agency (FEMA) NFHL (National Flood Hazard Layer) web service in this fashion. Similarly, the present invention access and utilizes water gauge information from USGS or NWS. It also adds various other information such as landmarks, transportation, environmental, and administrative data to further enhance the representation of a water event.

8. The present invention produces maps of water events; map is one of the most widely used form today, either a physical one such as paper map or digital one on a computer display. For example, the present invention produces maps containing one or multiple water models or multiple frequencies; when all the models show up on a single map, readers of the map can draw in sights that may not be obvious otherwise. These maps are valuable for various purposes including risk communication, risk assessment, and insurance underwriting. The present invention uses various combinations of hardware and software for creating maps. For example, using ArcGIS Desktop software, an operator can produce the right look and feel of the map by choosing various styles, symbols, labels, positioning of scale bar on screen or paper, font size of legend, etc. A particularly powerful way for displaying maps is to display them using certain modern software, such as Google Map, Google Earth (Pro edition or others), Bing Map, ArcGlobe, and ArcGIS Earth. Users can access these flood maps and graphics on screens of various devices, such as computers, GPS receivers, or mobile phones. The present invention prefers to produce maps, representations, and visualizations on the fly. The present invention also pre builds maps, videos, graphics, visualizations, and other products. The present invention organizes and stores the prebuilds into "scenario libraries." Because these scenario products are pre-generated, they can quickly be retrieved for displaying, querying, analysis, or other purposes.

9. The present invention builds various software and hardware to create visualizations and other derivative products of water models. The present invention also uses software and hardware that are in existence and available. For example, the present invention uses Google Earth (Pro edition or others) to manipulate the data and create 2D or 3D visualizations of water events, with geographic context such as buildings, trees, water bodies, etc. Operators and viewers directly interact with the software to "customize" the visual effects, such as tilting viewing angle, adding relevant data, or changing the viewing distance. These visualizations and products, not in the sense of traditional maps, are powerful means for understanding and interpreting water events, their geographic context, and the relationship between these two. They serve various purposes such as communicating risks, situation awareness, aiding selling insurance, or aiding selling real estate properties.

10. The present invention can transform water models into, or use them to create, products of Virtual Reality (VR), Augmented Reality (AR), Mixed Reality (MR), or Hybrid Reality (HR). In this application, we loosely call all of them VRAR. One uses a special piece of hardware to view and interact with VRAR residing on an electronic device such as mobile phone or computer. Such products provide an immersive experience for the viewer. For example, when a person points a mobile device with a built-in camera toward a building a river, or a location, the present invention displays on the screen a scenario based flood water surface, as if it is real and happening now and at the location, where the surroundings is captured by the camera on the device. Similarly, VRAR of water events can display on a dashboard of a vehicle, a game console, etc. By looking at this VRAR, one can better perceive the effect and impact of water events, such as where the water would reach and how high the water would rise at a location. If there are manmade structures at the location, the virtually visible water level would show how high it would reach on the side of the structure. Field workers can also take advantage of such an application by pointing mobile devices on which relevant information is superimposed on view finder or screen. An emergency response manager can see a forecasted event this way. An insurance agent or a real estate agent can see historical or probabilistic events on apiece of property. The preset invention produces VRAR for various devices including Google Earth VR on mobile phones. The present invention also produces or transforms water models of Federal Emergency Management Agency (FEMA) flood maps, historical flood events, or other scenarios into VRAR.

11. To produce VRAR, the present invention uses both special software and hardware, such as Google's VR SDKs. The present invention imports and transforms water models into a virtual world. This "reality" is be then utilized and viewed by a special viewer, a piece of hardware. There are numerous manufacturers of VRAR viewer of various forms and designs. Google's Cardboard is one. Microsoft HoloLen s is another.

12. A flood augmented graphic (can also be video, app, game, etc.) is shown in FIG. 6 by using Google Street View. The picture is a direct and "real" snapshot through the lens of a camera at the location. The partially inundated building is shown in 3D fashion. This flood augmented picture reflects the modeled flood depth for that location. By simply glancing at the picture, one can understand the effect of the modeled water event. FIG. 6 illustrates a flood augmented picture using Google Street View reflecting the modeled flood depth for that location. It is a powerful tool.

13. The present invention produces graphical representations of water events, which are particularly beneficial for broadcasters, on TV or internet. Broadcasters can choose to show the full or partial screen display of the software and hardware they interact with. That display can be a static or animated backdrop. Viewers can see what is happening on that computer screen as the broadcaster interact and manipulate the model.

14. The present invention currently prefers producing detailed 3D and photo realistic visualizations of water events. It accomplishes this by using software such as Google Earth (Pro, VR, or another edition. Configuration includes turning on "Photo realistic atmosphere" in Preference and "Detailed 3D" layer in the Default Layers.)

15. The present invention produces "fly-over" visualizations of water events. When combined with detailed and photo realistic 3D effects, they become especially powerful. "Flights" are not limited by weather, or by resources. It can be day or night, cold or hot, rain or sunny, foggy or clear, high or low, fast or slow, and anytime, however times, etc. The visualizations serve various purposes, such as, promoting a conservation effort; promoting a restoration site; preserving wetlands; conducting survey; communication of flood events; promoting tourist of a beautiful river, lake, shore; and selling water event related products. FIG. 7 illustrates one frame of a fly-over video showing the flooding event during Hurricane Sandy on Oct. 29, 2012 near Jersey City, N.J.

16. The present invention produces products in both 2D and 3D fashions. The present invention currently prefers using elevated water features to create 3D products of a water event. To do so, the water surface elevation needs to be preserved during earlier stages of the process, as described in this application. The resulted products reflect the reality more closely. An alternative is to simply "drape" the flooding extent on top of the earth surface model. This is a common practice among practitioners; sometimes called "clamp to the ground or seafloor." But this approach, as well as others such as assigning a fixed relative elevation, is less accurate and can be misleading when comparing with the 3-dimensional representation.

17. The present invention adds, reduces, modifies, or eliminates information as visual elements in the final output to deliver "just the right amount" of information to the viewer. It adds visual objects, animated or stationary, to further enrich the representation. For example, the present invention adds vehicles, planes, and ships to a video. It also has the flexibility to add existing or planned structures and infrastructures, such as bridges, buildings, shopping malls, wetlands, restoration sites, designing scenarios, etc. These "graphical objects" can be acquired if they exist already, or created using various software packages, such as SketchUp. The present invention performs this task of modification before, during or after the video is recorded. For example, during post processing of a recorded video clip, the present invention often adds in 2D or 3D objects, such as a building.

18. Videos, animated graphics, and other animated visualizations (in this application we use the term "animated products") are among the most effective for the human eyes to consume and interpret. For example, an animated and flood augmented film, video clip, or GIF graphic, can be shown on the internet, social media, TV, mobile devices, etc., to communicate flood risk, promote public awareness, aid selling risk products and insurance.

The present invention creates animated products for one or more current situations in real-time or near real-time fashion, or for forecasted/predicative events. The present invention also creates other scenario-based animated products, such as probabilistic, hypothetical, arbitrary, or imaginative. Such a product serves many practical purposes, such as, aiding a weather broadcast; describing the effects of a natural disaster, illustrating a dam/levee breach scenario; or depicting a design scenario for a structure, e.g. a bridge, building, segment of a road, etc.

The present invention prefers adding temporal factors into the animated products. For example, the present invention creates a series of water events models and representations for different times. The present invention then puts all of them together in an animated product; viewers can see the change of the event overtime without any difficulty or frustration.

To create animated products for water events requires special hardware, software, and various workflows. One of the current preferences is to use Google Earth (Pro, VR edition, or others) on a computer workstation. After loading one or more water models into the software, an operator configures various parameters, adopt various workflows, and build various look and feel of the product. These parameters and workflows include:
  a. 3D View effect including color depth (16 or 32 bit), Graphic Mode (OpenGL or DirectX), Use High Quality Terrain and Use 3D Imagery, Elevation Exaggeration level, and Use Photo realistic atmosphere rendering, etc. Currently, the preferred set up is a 32-bit color depth, DirectX on a Windows machine, High Quality Terrain and 3D imagery, one for Elevation Exaggeration level, and uses Photo realistic atmosphere rendering.
  b. The look and feel of the water such as color, opacity, transparency, fill pattern, boundary style, etc. Currently, the preferred color is purple, with less than 90% opacity.
  c. The water model altitude: Absolute, Clamped to Ground, Clamped to Sea Floor, Relative to Ground, Relative to Sea Floor. Currently, the preferred is to use the ABSOLUTE.

Among various ways recording a video in Google Earth (Pro or others), using a previously recorded tour is the current preference. First step is to create a "path" by using the "Add a Path" function in Google Earth (Pro or others). This pre-defined path is then used to create a "tour" in Google Earth (Pro or others) which automatically simulating flying over according to the defined path. This preferred method would not require user input during recording. An alternative workflow is to directly record movement controlled by your mouse, keyboard, or other controlling devices.

When creating a tour based on a pie-defined path, the present invention allows the operator to decide on the recording settings such as Camera Tilt Angle (currently preferred is 79 degree) Camera Range (currently preferred is 900 meters), and Speed (currently preferred speed is 200.) The current preference for managing all pre-designed and pre-built paths and tours is setting up a repository and accessing it over the internet. One can choose any path or tour for the next video recording. This repository, or library, also accepts submittals from various users to expand the collection.

One can record a video, based on a tour produced above, by using the Movie Maker function built in Google Earth (Pro or others.) The operator configures multiple parameters regarding the output quality and format, such as, Compression Formats, e.g. WMV9 16 mbps; Live Mouse and Keyboard navigation or a saved Tour; where to save the video file; and the WMV, AVI, or Image Stream video file format. Various resolution settings, including 1920×1080 and 1280×720 are available. Currently, the preferred resolution setting is 1920×1080.

One can choose various combinations of software and hardware, similar to Google Earth (Pro edition or others) to create animated products. The present invention also uses ESRI's ArcGlobe or ArcGIS Earth, Google VR, etc. The creator controls which visual elements to show by turning on or off layers available. It is important for creators to decide on the right amount of information showing in animated products. If the amount of information visible is too much or too little, it may cause frustration on the viewer. A creator of animated products of water events has flexibilities and control before, during, or after the products are created or recorded. For example, using common video editing software, creators further "post process" the animated products to a desired satisfaction level. During post processing, the present invention adds audio and caption, applies certain special effects, changing color of a visual element, or converting to a different format, etc.

Use of Purple to Symbolize Water in Visual Products

Water needs to standout distinctively for visual representations of water events, otherwise the visual products do not represent water events effectively. This functional requirement is a challenge for producers of water products, especially for broadcasters who also need the visual to be, besides distinctively visible, attractive and interesting.

The present invention currently prefers using PURPLE for symbolizing water and water events. The present invention creates variations of purple by adjusting transparency, opaqueness, saturation, textures, etc. Purple makes the water "stand out" from other visual elements in the display. Various transparency settings also aid the producer in controlling the level of visibility of those features under the water surface. Higher transparency allows features under water to be more visible, while a lower transparency hides them more. The current preference of purple transparency is "40-93%"

Module 3: Acquiring, Producing, Distributing, and Displaying Derivatives, Analytics, and Tools of Water Events After water models are produced and transformed into consumable forms and formats, machines and human can then conduct various activities and produce various products to serve various purposes. The present invention produces machine services (e.g. web services) to publish such information including base flood elevation (BFE), lowest adjacent grade (LAG), highest adjacent grade (HAG), premium estimates, etc.

The present invention also acquires such information over the network from a system, an electronic device, or apiece of software. Various systems (e.g. real estate information sites such as Zillow, Trulia, realtor.com, and others, flood-related websites, insurance-related systems, etc.) can display such information, along with other information such as advertisement.

The present invention produces, distributes, and acquires virtual perimeters of events for automatic machine action. A virtual perimeter can be produced based on models of events and other relevant information. In its simplest form, it is the boundary of an impacted area by an event. In a more detailed description, a virtual perimeter is just a set of spatial selecting criteria that can be used to define an impacted area. The present invention publishes virtual perimeters through machine services. The production and distribution can be requested by another machine over network. Once a virtual perimeter is produced or acquired, the present invention uses it to perform various machine actions including selecting features, placing objects, manipulating autonomous moving objects, identifying advertisement targets based on spatial and temporal factors of the perimeter, pushing advertisement, sending information, notification, or other automatic machine actions, and timing actions.

The present invention uses an event-driven approach to select, locate, identify tarts of information (such as advertisement) based on spatial and temporal characteristics of any event. This is particularly effective when an event's spatial extent changing overtime. Once targets are dynamically selected based on impacting time and impacting space, information to be sent can be determined, and information is sent to the identified targets electronically or some other way, at a certain selected timing. For example, dynamic flooding events can be opportunities to pass flood insurance information. A raining event is an opportunity to sell umbrellas.

3A: Acquiring, Producing, Distributing, and Displaying Data by Locating and Identifying Features Relevant to Water Events Based on consumable water models and through various software and hardware, the present invention selects, locates, identifies, and extracts various features relevant to the water events' location, extent, and other characteristics. For example, using spatial extent of the water event, the present invention locates and identifies any features with a location as within or outside the inundated areas, totally or partially inundated, or how much above or below a water surface. The present invention locates and identifies anything with a location, or even locations themselves, according to one or more water events. As another example, the present invention identifies and locates "First Impacting" events, associated characteristics, and impacted location and/or structures at that location. The present invention represents these features as points, lines, polygons, 2D objects, 3D objects, or combinations of the above. The present invention locates and identifies features that are stationary or mobile, physical or virtual, life forms or lifeless, natural or manmade, real or imaginative, etc. The present invention locates and identifies features according to water events that are current, historical, future, predicative, hypothetical, or probabilistic, arbitrary, imaginative, etc.

The present invention locates and identifies features and locations such as inundated areas for a past, current, or future event; flood prone areas based on probabilities of risk; human assets (e.g. emergency managers in charge of an area); property owners; business owners; factory managers; protected lands and animals; etc. The present invention locates and identifies physical features including structures, infrastructures, transportation features, factories, plants, businesses, real estate properties, heavy equipment, and farms, etc. The present invention locates and identifies mobile assets such as vehicles, ambulances, taxis, cars, trucks, drones, ships, or airplanes. Other examples of mobile assets include mobile home, shelters, mobile heavy equipment, etc. The present invention locates, identifies, and places virtual objects and assets such as those in electronic games (e.g. a virtual monster), a moving object in a software system, design scenarios for a proposed bridge, a proposed shopping mall, etc.

The present invention uses an event-driven approach to select, locate, identify tarts of information (such as advertisement) based on spatial and temporal characteristics of any event. This is particularly effective when an event's spatial extent changing overtime. Once targets are dynamically selected based on impacting time and impacting space, information to be sent can be determined, and information is sent to the identified targets electronically or some other way, at a certain selected timing. For example, dynamic flooding events can be opportunities to pass flood insurance information. A raining event is an opportunity to sell umbrellas.

The system and method of the present invention have the capability and capacity for timely locating and identifying features. Timely and on-the-fly locating and identification of features for a given location is particularly critical for various fields such as emergency response.

The present invention produces, distributes, and acquires virtual perimeters of water event for automatic machine action.

3B: Acquiring, Producing, Distributing, and Displaying Various Information and Tools Based on Water Models and Located/Identified Features Once water models are created and features are located and identified, the present invention performs various operations on such information, including further processing, further manipulations, listing, querying, storing, displaying, etc. The present invention produces various information, analytics, derivatives, tools, software, and hardware for various purposes, such as assessing flood risk of a location; assessing flood risk of a real estate property based on calculated risk probabilities; assessing flood risk of a proposed or existing government building, or any infrastructures (bridges, roads, hospitals, etc.)

The present invention uses the data produced to determine whether a real estate property needs to purchase flood insurance based on whether it is outside of Federal Emergency Management Agency (FEMA) 100-year or 500-year flood plain; and/or to calculate flood insurance premium if a real estate property is identified as completely within or partially within a flood plain. The present invention uses both the spatial extent and the modeled water surface elevation for this purpose. Combined with estimated structure elevation such as lowest floor elevation, the present invention uses the elevated water surface of a probabilistic map, such as, 1% Federal Emergency Management Agency (FEMA) Flood Insurance Map (FIRM), to determine whether a structure is above water surface elevation, which would aid Federal Emergency Management Agency (FEMA) LOMA (Letter of Map Amendments) process (MT-1).

Referring to FIGS. 8-12, the present invention uses one or multiple water models to determine the flood risk of a location or a structure. For example, based on one or multiple water models, the present invention determines the "First Impacting Event", a threshold event, for a location or a structure. The present invention uses "Threshold Events" and associated characteristics for various purposes including assessment of flood risk, producing integrated analytics, reports, tools, and services for a holistic description of flood risk, calculating flood insurance, and communicating flood risk.

The present invention assesses flood risk for calculating flood insurance premium by determining flood risk of a location or a structure using the concept of Threshold Events, such as, First Impacting and Last Impacting events.

The present invention produces derivative information products and tools, and use them for calculating flood insurance premium based on historical inundation models. To model and determine historical inundations on a location, a structure, or any feature, the current preference is to first determine a flooding "threshold" stage. For example, for a structure, the present invention models various water stages and identifies a threshold as the lowest stage when the resulted water "touches" the structure or the location. Once the threshold stage is determined, the preset invention then identifies the historical stages higher than that threshold. The present invention produces various analytics to provide valuable insights such as how many times this location was inundated in the past; how severe each time was; and how much estimated damage it endured Based on such analytics, and combined with other information, the present invention, or an insurance underwriter, then calculates an insurance premium for the property.

Elevation characteristics of structures, properties, and locations play a key role in various processes, especially the process of calculating flood insurance premium. For example, Lowest Floor Elevation of a structure (also known as First Floor Elevation commonly used in the Federal Emergency Management Agency (FEMA) flood space) is commonly used for this purpose. It is costly to acquire elevation characteristics of a location, a property, or a structure; one needs to contract a professional land surveyor and pay hundreds even thousands of dollars to obtain an "elevation certificate."

The present invention acquires key information by querying and retrieving from data source. Such information include elevation, building characteristics (e.g. type of building, basement existence, foundation, etc.) Based on acquired information, analytics necessary for rating risk or insurance premium can be produced. The present invention acquires said key information based on user inputs through a system such as a mobile app or a web browser. The preset invention acquires features with coordinates by querying an existing data source, by analyzing available information, or letting user input such information including digitization on screen as points, lines, or polygons. The present invention produces analytics such as Lowest Adjacent Grade and Highest Adjacent Grade based on information acquired based on the feature with coordinates.

The present invention determines elevation for both out side and inside of a structure. The present invention determines elevation OUTSIDE a structure through various means including traditional measurement in the field, through a mobile device equipped with a barometer, through analysis based on image analysis, querying various digital elevation datasets, querying and process LiDAR data, querying existing datasets, etc. The present invention determines elevation INSIDE a structure through various means including traditional surveying, querying and/or analyzing existing databases of building characteristics, image analysis, using a barometric device, or acquiring from a data source, etc. To determine elevations, especially elevations INSIDE a structure, the present invention prefers using a device, such as a mobile phone, on-site for obtaining elevation characteristics. This device is equipped with a sensor or sensors capable of measuring certain conditions of a location, such as barometric pressure, based on which elevation of the device is be directly or indirectly obtained. Currently preferred method for calibrating is to have at least two control points for measuring elevation inside a structure, one inside and one outside. The final elevation indoor is the result of the outside base elevation plus/minus the elevation difference between outside control point and the inside control point, then plus/minus the elevation difference between the indoor control point and the intended position for elevation acquisition. The current preference is to acquire elevation at one or more locations inside the structure. The current preference is to place such a device inside or outside of a structure, obtain one or more barometric measurement and elevation (aka. altitude) readings through a mobile app on such a device, and send such information to a "calculating module" by various means such as transmitting along with other relevant information automatically through the mobile app to a networked location, or simply by calling an operator who would then "key in" the information to calculate premium. Based on elevation information obtained, and combined with information of water models generated in STEP 1 and STEP 2, the present invention generates various products to save various purposes including obtaining elevation of a location and calculating risk or flood insurance premium.

The present invention includes various processes for producing, using, and applying derivative products for various purposes such as producing assessment of farmland damage; producing Federal Emergency Management Agency (FEMA) FIRM maps, FIRM databases, Depth Grids, and Flood Insurance Study reports; risk rating for insurance purposes; producing information needed for planning and preparation for emergency management purposes; producing information regarding placement of physical or virtual goods; producing various software, hardware, systems for one or more water events; producing analytics, derivatives, and visualizations for various scenarios; producing inundation map libraries; and producing timely inundation information, and inundation forecast.

Physical or virtual goods, features, and objects, often need to be placed according to a water event. The present invention performs or aids such an operation. The present invention places objects in various ways including placing anywhere outside a current or forecasted inundation area, or within a buffer zone of an event. The present invention performs placement of virtual objects, such as one in an electronic game, according to various criteria such as avoiding current or future inundated areas. The present invention performs or aids the placement of a vehicle that is near or steered toward inside a current or forecasted inundated area. The present invention performs or aids the placement of rescue equipment to be strategically positioned inside or near the current/future disastrous areas. The present invention continuously checks locations of mobile objects and determines when they cross in or out of the boundary of a water event. Insofar as we know now, nobody else has tried this with a flood zone, current or forecasted.

3C: Producing Derivatives, Analytics, Information, Services, and Tools for Communication, Outreach, Warning, Notification, and Action Taking The present invention produces various information, analytics, derivatives, and tools bad on modeled water events. Examples of such products include graphics, maps, visualizations, reports, emails, text or other types of messages, TV programs, live broadcast, recorded programs, machine messages, etc. When delivered as machine messages over the network, these products play a critical role in dealing with water events by communicating with various machines including software, electronic devices, GPS receivers, vehicles, phones, pagers, game consoles, etc. These products serve various purposes, particularly effective for communication, notification, alerting, warning, flood risk communication, and outreach.

Products of water events (Real time, near real time, historical, predicative, hypothetical, probabilistic, arbitrary, or imaginative) are particularly effective for communicating flood risk to people. For example, the present invention produces 3D visualization and animated products showing inundated areas of historical events such as Hurricane Agnes in 1972, Hurricane Hugo in 1989, and Hurricane Sandy in 2012. The present invention generates such products to aid vies digest the massive magnitude and extent of these historical events and reduce any difficulty or frustration. The present invention generates these products to explain flood risks to insurance underwriters or property owners, who are potentially purchaser of insurance policies. The present invention creates and uses such products for various purposes including land management, city planning, flood plain management, transportation planning, infrastructure designing communication, outreaching, and community engagement. These products are also valuable for insurance underwriters, insurance agents, and current or potential insurance customers.

The present invention produces integrated reports and other analytics that consist of multiple water models. For example, a single map that shows all available flood plain boundaries of multiple flood frequencies allows viewers of the map have a holistic view of flood risks.

The present invention produces analytics of First Impacting Events in various forms such as physical or electronic forms. For example, for one structure, the first impacting event of flood could be 0.1% event, or 1 in 1000. The First Impacting Event of flood for another structure could be 1% event, or 1 in 100. This "number" can be used to explain the difference of the flood risk for the two structures, and potentially explain why the premium of the first building is lower than the second. This is a powerful risk communication tool that can be applied consistently anywhere.

The present invention displays or broadcasts information or visualizations of a water event on TV, radio, internet, or on a machine during a town hall meeting showing where was underwater before, where is underwater now, or where will be underwater. The present invention broadcasts live or as pre-recorded. Doing this would make viewers understand in an instant the event's significance, especially the imminent effect of a future event. This type of massive and timely production and distribution of water events has no precedence, insofar as we know now. The concept of "The Flood Channel" would make the communication even easier and better. It is a one-stop content place for acquiring and distributing flood-related information. Contents take various forms such as video, radio show, text, graphics, etc. The flood content is distributed timely (live or recorded) on TV, internet, social media, or websites. The content comes from various sources, including those from users and viewers of The Flood Channel.

The present invention generates various analytics for various purposes. For example, the present invention produces a revolutionary analytic, currently named M3F Report, as shown in FIG. 12. This unprecedented report presents insights regarding flood risks based on multiple models, and multiple frequencies. For example, one key element of the report is the multiple frequency modeling for a location. The models provide spatial extent, water surface elevation, and depth. All the information is valuable for various purposes including insurance rating. Based on multiple models, the present invention determines the First Impacting Event and its characteristics (such as flood frequencies). This is again unprecedented.

One of the biggest benefits of the present invention is that the timely generation of various event products. This is suitable particularly for critical situations. For example, flashflood comes quickly and goes quickly, often within an hour. Because of the rapid nature, the present invention generates and distributes warnings and alerts in a timely fashion. Potentially, this would save lives.

Because the present invention generates various analytics rapidly, it lowers the cost that previously prohibiting any practical usage of multiple models for an accurate determination and assessment of flood risk.

The present invention distributes information and products of an imminent event through various forms and mechanisms, such as alerting text messages, email notifications, announcements, videos, graphics, voices, etc. Notification reaches people or machines, such as software, mobile apps, game consoles, GPS devices, phones, navigation devices, vehicles, TVs, radios, phones, pagers, etc. The present invention allows human or machine request such information by PULL mechanism or pushing such information to and the viewer through various media TV, internet, radio, mobile platforms, mobile apps, etc. Such information can automatically trigger various actions such as play of a recorded voice, readout of text message through speakers, or forwarding of warning messages. The receiving end, in the case of an electronic device, can take actions on behalf of the user of the device through certain algorithms without requiring actions from a human. For example, a self-driving, driverless, or unmanned vehicle, car, truck, taxi, vessel, or drone, receives warning of inundation 3 miles ahead. Algorithms on the vehicle's control system can interpret the information and take actions such as stopping, detouring, or turning around Algorithms can also alert the passenger or driver in the vehicle, by displaying the information or playing an audio, requesting a decision. A navigational system on a vehicle can suggest a different route to the driver to consider avoiding inundated areas. Similar, a control system on a self-driving driverless, or unmanned vehicle can automatically decide and take a detour to avoid certain areas such as an inundated area.

Based on water models and derivatives, the present invention timely locates and identifies features affected by a water event. Alerts, notifications, and warnings are timely distributed to those located or identified features. For example, the current invention identifies and locates vehicles, mobile devices, properties, businesses, or humans that are affected by a current or forecasted inundation area, ortho se that are safely outside a buffer zone, or those approaching the imminent danger. For those that are approaching the inundation zone, the system notifies the user through various ways, in realtime or near real time. Once notified with enough lead time, a device or a person can simply "turn around, don't drown." (This is a slogan by National Weather Service.)

The "Virtual Perimeter" method, insofar as we know now, has never been applied to the field of flooding events in a timely, effective, efficient, and large-scale way. The present invention is intended to save lives by putting this method into practical use.

The present invention delivers and distributes information of water event related through a platform, currently named "The Flood Channel."

Various information and analytics about water events is available for querying, display, or whatever the purpose is, either by individuals or by institutions, through an electronic device;

This platform allows users to define and submit requests from an electronic screen, including digitization of coordinated features (point, line, polygon, or other entities) on screen to be used for analysis. Service requests including insurance quote, risk assessment, mortgage applications, etc.

This platform receives and processes service requests from users; the platform may request from multiple sources to fulfill the request. For example, in the case of a request for insurance quote, the platform can choose to take various actions including: displaying premium estimate, providing a mechanism for user to refine or change the request, presenting one or more options such as going further for more detailed information, requesting quotes from one or multiple sources, comparing received quotes, select a favored one, displaying information back to the requester, and asking user whether to proceed to a suggested process such as conducting the transaction, getting more details, contacting quote providers, displaying advertisement, etc.

This platform is a place connecting multiple groups of "water event interested" parties, either individuals such as home owners or institutions such as real estate companies, agents, insurance companies, underwriters, flood professionals, etc.

This platform facilitates interactions and transactions among various groups of users;

This platform can also be used for large-scale distribution flood information, especially time-sensitive notifications and warnings. Live broadcast is particularly effective for situation awareness among a large audience. Broadcasts are conducted on TV, radios, or internet. Once information of water events is broadcasted and received, a machine or human can take various actions accordingly.

It will be apparent to those skilled in the art that various modifications and variations can be made to the system and method of the present disclosure without departing from the scope or spirit of the disclosure. It should be perceived that the illustrated embodiments are only preferred examples of describing the invention and should not be taken as limiting the scope of the invention.

We claim:

1. A Method for producing tools and distributing information on water events, comprising the steps of:
    a) modeling First and Last Impacting Events to determine threshold events;
    b) monitoring and retrieving conditions of weather and water events including said threshold events;
    c) preparing water events conditions;
    d) modeling said retrieved water events;
    e) transforming said modeled water events into consumable forms;
    f) producing water event tools and information visualizations based on said transformation;
    g) acquiring information on an electronic machine; and
    h) producing services and displays of produced information products.

2. A method for producing tools and distributing information on water events in accordance with claim 1, wherein said step a) further comprises the steps of:
    a1) determining da mage curves;
    a2) applying boundary conditions; and
    a3) rating risk and premium based on said threshold events.

3. A method for producing tools and distributing information on water events in accordance to claim 1, wherein the producing information products and visualizations further comprises the steps of:
    i) sending and receiving virtual perimeter to a machine; and
    j) producing virtual perimeter information based on the virtual perimeter received.

4. A method for producing and distributing information on water events in accordance to claim 1, further comprising the steps of:
    i) acquiring and calculating all water event and elevation inputs including user inputs;
    j) transforming said acquired water event into proper formats;
    k) producing elevation-related information based on said user inputs or barometric measurements; and
    l) producing various products including an elevation 3D water event visualization.

5. A method for producing and distributing information on water events in accordance to claim 1, further comprising the steps of:
    i) determining water event spatial and temporal characteristics;
    j) identifying targets;
    k) deciding which information to be transferred; and
    l) transmitting information by pushing or pulling.

6. A method for producing and distributing information on water events in accordance to claim 1, further comprising the steps of:
    i) producing and displaying information on water events for the consumption of various groups;
    j) requesting and receiving information from one or multiple users;
    k) providing recommendations and information of water events to the users; and
    l) facilitating interactions among users.

* * * * *